(12) United States Patent
Rieder et al.

(10) Patent No.: US 7,562,586 B2
(45) Date of Patent: Jul. 21, 2009

(54) METHOD FOR MONITORING AN OPERATING CONDITION OF A TUBE WALL CONTACTED BY A FLOWING MEDIUM AND INLINE MEASURING DEVICE THEREFORE

(75) Inventors: Alfred Rieder, Landshut (DE); Michael Fuchs, Eschbach (DE); Wolfgang Drahm, Freising (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/584,510

(22) Filed: Oct. 23, 2006

(65) Prior Publication Data

US 2007/0095153 A1    May 3, 2007

Related U.S. Application Data

(60) Provisional application No. 60/729,212, filed on Oct. 24, 2005.

(30) Foreign Application Priority Data

Oct. 21, 2005    (DE)    ................. 10 2005 050 898

(51) Int. Cl.
G01F 1/84    (2006.01)
(52) U.S. Cl. .................................. 73/861.357
(58) Field of Classification Search .............. None
See application file for complete search history.

(56) References Cited

U.S. PATENT DOCUMENTS

| | | | |
|---|---|---|---|
| 4,524,610 A * | 6/1985 | Fitzgerald et al. .......... 73/54.25 |
| 6,557,422 B1 | 5/2003 | Kolahi | |
| 7,040,180 B2 * | 5/2006 | Matt et al. ............. 73/861.357 |
| 7,040,181 B2 * | 5/2006 | Rieder et al. ............ 73/861.357 |
| 7,181,982 B2 * | 2/2007 | Christian et al. ........ 73/861.357 |
| 7,284,449 B2 * | 10/2007 | Rieder et al. ............ 73/861.356 |
| 7,296,484 B2 * | 11/2007 | Rieder et al. ............ 73/861.356 |
| 2003/0212509 A1 | 11/2003 | Henry | |
| 2003/0233878 A1 | 12/2003 | Drahm | |
| 2005/0229719 A1 | 10/2005 | Rieder | |
| 2006/0010990 A1 | 1/2006 | Matt | |
| 2006/0086196 A1 * | 4/2006 | Rieder et al. ............ 73/861.356 |

(Continued)

FOREIGN PATENT DOCUMENTS

DE    37 38 018 A1    5/1989

(Continued)

*Primary Examiner*—Harshad Patel
(74) *Attorney, Agent, or Firm*—Bacon + Thomas, PLLC

(57) ABSTRACT

An inline measuring device comprising a measurement pickup of vibration-type and measuring device electronics electrically coupled with the measurement pickup. The measurement pickup includes at least one, essentially straight measuring tube, an exciter mechanism acting on the measuring tube for causing the at least one measuring tube to vibrate, during operation, with torsional oscillations about a torsional oscillation axis, and a sensor arrangement for registering vibrations of the at least one measuring tube and delivering at least one oscillation measurement signal representing oscillations of the measuring tube. The measuring device electronics delivers, at least at times, an exciter signal driving the exciter mechanism and generates, by means of at least one of: the at least one oscillation measurement signal and the exciter signal, at least one measured value, which represents at least one physical, measured variable of the medium to be measured.

48 Claims, 5 Drawing Sheets

U.S. PATENT DOCUMENTS

| | | |
|---|---|---|
| 2006/0278019 A1* | 12/2006 | Christian et al. ....... 73/861.356 |
| 2007/0137313 A1* | 6/2007 | Rieder et al. ........... 73/861.357 |
| 2007/0180929 A1* | 8/2007 | Rieder et al. ............. 73/861.17 |
| 2007/0186686 A1* | 8/2007 | Drahm et al. .......... 73/861.357 |

FOREIGN PATENT DOCUMENTS

| | | |
|---|---|---|
| DE | 100 02 635 A1 | 8/2001 |
| DE | 600 09 065 T2 | 3/2005 |
| EP | 1 190 221 B1 | 3/2002 |
| WO | WO 89/04463 | 5/1989 |
| WO | WO 03/029760 A1 | 4/2003 |

\* cited by examiner

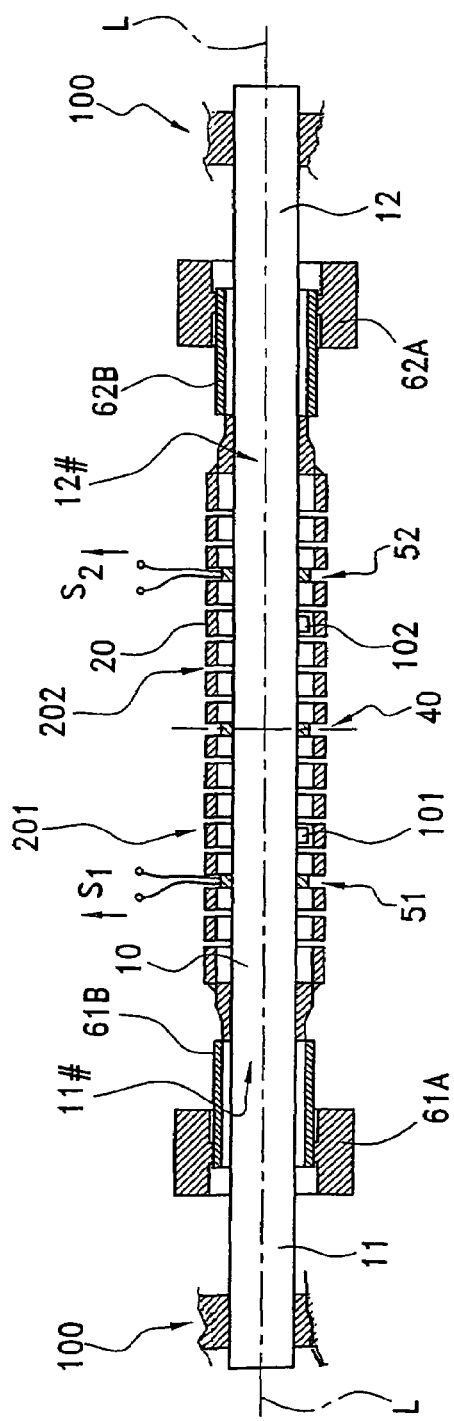
FIG. 3
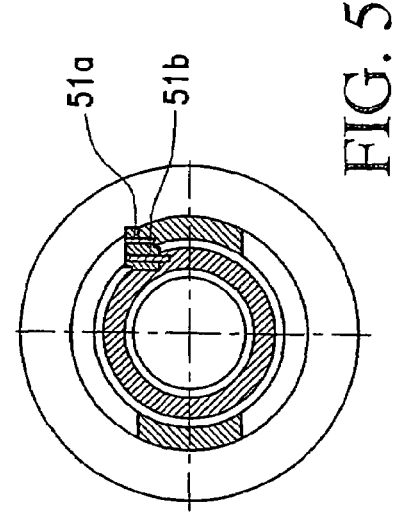
FIG. 5
FIG. 4

METHOD FOR MONITORING AN OPERATING CONDITION OF A TUBE WALL CONTACTED BY A FLOWING MEDIUM AND INLINE MEASURING DEVICE THEREFORE

FIELD OF THE INVENTION

The invention relates to an inline measuring device having a vibration-type measurement pickup, or transducer, especially a Coriolis mass flow/density measuring device, for measuring a medium flowing in a pipeline, especially a two, or more, phase medium, as well as to a method for producing, by means of such a measurement pickup, a measured value representing a physical, measured variable of the medium, for instance a mass flow, density and/or viscosity of the medium.

BACKGROUND OF THE INVENTION

In process measuring and automation technology, inline measuring devices, especially Coriolis mass flow measuring devices, are often used for measuring physical parameters of a medium flowing in a pipeline, parameters such as e.g. mass flow, density and/or viscosity. By means of a measurement pickup, or transducer, of vibration-type, through which the medium flows during operation, and by means of a measuring and operating circuit connected thereto, these devices effect reaction forces in the medium, forces such as e.g. Coriolis forces corresponding to mass flow rate, inertial forces corresponding to density, frictional forces corresponding to viscosity, etc., and produce, derived from these forces, measurement signals representing, respectively, the instantaneous mass flow rate, viscosity and/or density of the medium. Such inline measuring devices with a measurement pickup of vibration type, as well as their manner of operation, are known per se to those skilled in the art and are described comprehensively in e.g. WO-A 05/040734, WO-A 05/040733, WO-A 03/095950, WO-A 03/095949, WO-A 03/076880, WO-A 02/37063, WO-A 01/33174, WO-A 00/57141, WO-A 99/39164, WO-A 98/07009, WO-A 95/16897, WO-A 88/03261, US-A 2004/0200268, US-A 2003/0208325, U.S. Pat. No. 6,889,561, U.S. Pat. No. 6,840,109, U.S. Pat. No. 6,691,583, U.S. Pat. No. 6,651,513, U.S. Pat. No. 6,513,393, U.S. Pat. No. 6,505,519, U.S. Pat. No. 6,006,609, U.S. Pat. No. 5,869,770, U.S. Pat. No. 5,796,011, U.S. Pat. No. 5,616,868, U.S. Pat. No. 5,602,346, U.S. Pat. No. 5,602,345, U.S. Pat. No. 5,531,126, U.S. Pat. No. 5,301,557, U.S. Pat. No. 5,253,533, U.S. Pat. No. 5,218,873, U.S. Pat. No. 5,069,074, U.S. Pat. No. 4,876,898, U.S. Pat. No. 4,733,569, U.S. Pat. No. 4,680,974, U.S. Pat. No. 4,660,421, U.S. Pat. No. 4,524,610, U.S. Pat. No. 4,491,025, U.S. Pat. No. 4,187,721, EP-A 1 291 639, EP-A 1 281 938, EP-A 1 001 254 or EP-A 553 939.

For conveying the medium, the measurement pickups include, in each case, at least one measuring tube held in a, for example, tubular or box-shaped, support frame. The measuring tube, which has a straight tube segment, is caused, during operation, to vibrate, practically unifrequently, in a primary, wanted mode—driven by an electromechanical exciter mechanism—in order to produce the above-mentioned, reaction forces. For the registering of vibrations of the tube segment, especially inlet- and outlet-end vibrations thereof, the measurement pickups further include, in each case, a physical-to-electrical sensor arrangement reacting to movements of the tube segment.

In the case of Coriolis mass flow measuring devices, measurement of the mass flow rate of a medium flowing in a pipeline rests, for example, on the fact that the medium is allowed to flow through the measuring tube joined into the pipeline and oscillating, during operation, in the wanted mode laterally to a measuring tube axis, whereby Coriolis forces are induced in the medium. These, in turn, effect that inlet-side and outlet-side regions of the measuring tube oscillate with phases shifted with respect to one another. The size of these phase shifts serves as a measure of the mass flow rate. The oscillations of the measuring tube are, therefore, registered by means of two oscillation sensors of the aforementioned sensor arrangement. These sensors, which are spaced from one another along the measuring tube, convert the mechanical oscillations into oscillation measurement signals, from which the mass flow rate is derived from their phase shift with respect to one another.

U.S. Pat. No. 4,187,721 referenced above mentions further, that also the instantaneous density of the flowing medium is measurable by means of such inline measuring devices, and, indeed, on the basis of a frequency of at least one of the oscillation measurement signals delivered by the sensor arrangement. Moreover, most often also a temperature of the medium is directly measured in suitable manner, for example by means of a temperature sensor arranged on the measuring tube.

Additionally, straight measuring tubes can, as is known, when excited to torsional oscillations about a torsional oscillation axis essentially parallel to, or coinciding with, the longitudinal axis of the measuring tube, effect that radial, shearing forces are produced in the through-flowing medium, whereby, in turn, significant oscillatory energy is withdrawn from the torsional oscillations and dissipated in the medium. From this, a considerable damping of the torsional oscillations of the oscillating measuring tube results, so that, for maintaining the torsional oscillations, additional electrical exciting power must be fed to the measuring tube. Derived from an electrical exciting power required for maintaining torsional oscillations of the measuring tube, those skilled in the art can, in known manner, thus, determine, by means of the measurement pickup, also a viscosity of the medium, at least approximately; compare, in this regard, especially also U.S. Pat. No. 4,524,610, U.S. Pat. No. 5,253,533, U.S. Pat. No. 6,006,609 or U.S. Pat. No. 6,651,513.

A problem in the case of inline measuring devices of the described kind is to be seen, however, in the fact that the oscillatory characteristics of the measurement pickup and, to such extent, also the oscillation measurement signals derived from the oscillations of the measuring tube, are not only dependent on the primary, physical, measured variables of the medium, for example mass flow rate, density and/or viscosity, etc., and their changes during operation, but also, to a significant degree, on equally variable, secondary parameters, for example measuring-device-specific parameters or even parameters reflecting environmental and installation conditions. Representative examples of such changing, secondary parameters are the elastic and shear moduli of the materials used in the construction of the measurement pickup, as well as the geometry of the at least one measuring tube. The changes of the secondary parameters can, in such case, be both reversible, for example in the case of temperature-related, elastic deformations, and also, essentially, irreversible. Luckily, a large portion of such secondary parameters, or at least the influencing variables resulting in such changes, can be supplementally registered during measurement operation, and, to such extent, the influences of changes of such device and/or installation parameters on measurement accuracy can be largely compensated. This can, for instance, as proposed in U.S. Pat. No. 6,512,987, U.S. Pat. No. 4,768,384, EP-A 578 113, on the one hand, be implemented by using sensors additionally located in the inline measuring device, sensors such as e.g. temperature sensors, strain gages, acceleration sensors, pressure sensors, etc., and, on the other hand, be accomplished on the basis of the oscillation measurement signals themselves.

The principle of the compensation methods resting on the oscillation measurement signals is based essentially on the fact that, additionally to the primary, wanted modes causing the above-mentioned, reaction forces, other oscillation modes of most often, higher oscillation frequency are excited. These other oscillation modes serve mostly only as secondary, auxiliary modes. Thus, e.g. in WO-A 05/040734, U.S. Pat. No. 6,889,561, U.S. Pat. No. 6,557,422, U.S. Pat. No. 5,907,104, U.S. Pat. No. 5,831,178, U.S. Pat. No. 5,773,727, U.S. Pat. No. 5,728,952, and U.S. Pat. No. 4,680,974, in each case, an inline measuring device is disclosed for measuring at least one physical, measured variable of a medium conveyed in a pipeline. The inline measuring device comprises a measurement pickup of vibration-type and a measuring device electronics electrically coupled with the measurement pickup, wherein the measurement pickup includes:

at least one measuring tube serving to convey the medium to be measured and communicating with the connected pipeline;

an exciter mechanism acting on the at least one measuring tube for causing the at least one measuring tube to vibrate, which causes the measuring tube, during operation, to oscillate about an imaginary lateral oscillation axis, at least at times and/or at least in part, with first lateral oscillations having a first oscillation frequency; and which causes the measuring tube, during operation, to oscillate about an imaginary lateral oscillation axis, at least at times and/or at least in part, with second lateral oscillations having a second oscillation frequency; as well as a sensor arrangement for registering vibrations of the measuring tube and delivering oscillation measurement signals representing the oscillations of the measuring tube;

wherein the measuring device electronics delivers, at least at times, an exciter signal driving the exciter mechanism; and wherein the measuring device electronics generates, by means of the oscillation measurement signals an/or by means of the exciter signal, at least at times, at least one measured value, which represents the at least one, physical, measured variable to be measured for the medium.

On the basis of the oscillation measurement signals, the measuring device electronics determines, repetitively, the oscillation frequencies of the lateral oscillations of the measuring tube and determines and/or monitors, based thereon, at least one device- and/or installation-parameter of the inline measuring device, or detects at least one, unallowably high, measurement error.

As mentioned, among others, in WO-A 05/040734, also the formation of a deposit on the inside of the measuring tube wall, for example due to sedimentation, adhesion, or the like, can lead, to a considerable degree, to a degrading of the measurement accuracy of the inline measuring device, at least to the extent that this deposit formation is not taken into consideration in the determining of the measured value. Investigations have now shown, however, that an as early as possible detection of deposits on the measuring tube using multiple lateral oscillations can be associated with significant difficulties. This relates, in particular, also to the fact that, on the one hand, the density of the deposit naturally lies about in the range of the density of the medium, and, on the other hand, its influence on the lateral oscillations is approximately comparable with that of the medium being measured. As a result of this, a deposit, in the process of forming, can have essentially the same effect on the lateral oscillations as operational changes in the physical properties of the medium, especially changes in its density and/or viscosity.

Moreover, the case can also arise, that not only the at least one measuring tube of the inline measuring device becomes the subject of such a deposit, but, also, in particular, parts of the pipeline connected to the inline measuring device. This, in turn, can then, for example, lead to also other inline measuring devices and/or their inlet sections being affected by deposit formation, without that this would be recognizable, without more, by a corresponding self-validation on the part of the affected measuring devices.

SUMMARY OF THE INVENTION

An object of the invention, therefore, is to provide a corresponding inline measuring device having a measurement pickup of vibration-type, especially a Coriolis mass flow/density measuring device and/or a viscosity measuring device, which, on the one hand, is suited for measuring the physical variable to be measured, especially mass flow, density and/or viscosity, very accurately, and, on the other hand, is capable of detecting forming deposits, especially upon the exceeding of a minimum deposit thickness. A further object of the invention is to provide a corresponding method, which enables a reliable detecting and/or a sufficiently accurate measurement of a deposit formed on the measuring tube, on the basis of oscillation signals produced by conventional measurement pickups of the described kind. Additionally, an object of the invention is to monitor the tube walls contacting the medium, especially also the pipeline connected to the measurement pickup, for possible incidence of deposit.

To this end, the invention resides in an inline measuring device, for example one embodied as a Coriolis mass-flow/density measuring device and/or viscosity measuring device, for the measuring of at least one physical, measured variable x, for example a mass flow rate, m, a density, $\rho$, and/or a viscosity, $\eta$, of a medium conveyed in a pipeline. The inline measuring device includes a measurement pickup, or transducer, of vibration-type, as well as a measuring device electronics electrically coupled with the measurement pickup. The measurement pickup includes: At least one, essentially straight, measuring tube serving to convey the medium to be measured, by communicating with a pipeline connected thereto; an exciter mechanism acting on the measuring tube for causing the at least one measuring tube to vibrate and which causes the measuring tube, during operation, to execute torsional oscillations about a torsional oscillation axis imaginarily connecting an inlet end of the measuring tube and an outlet end of the measuring tube together; as well as a sensor arrangement for registering vibrations of the at least one measuring tube and which delivers at least one oscillation measurement signal representing oscillations of the measuring tube. The measuring device electronics delivers, at least at times, an exciter signal driving the exciter mechanism and generating, by means of the at least one oscillation measurement signal and/or by means of the exciter signal, at least at times, at least one measured value, which represents the at least one, physical, measured variable to be measured, for example mass flow rate, density or viscosity of the medium. Additionally, the measuring device electronics determines, repetitively, on the basis of the at least one oscillation measurement signal and/or on the basis of the exciter signal, an oscillation frequency of the torsional oscillations of the measuring tube and the measuring device electronics monitors, based on the oscillation frequency of the torsional oscillations, at least one operating condition of the at least one measuring tube.

Moreover, the invention resides in a method for monitoring an operating condition of a tube wall, which is contacted, at least at times, by a flowing medium and, as a result, is subjected, at least sectionally, to changes, by means of an inline measuring device, embodied, for example, as a Coriolis mass flow measuring device, having a measurement pickup and a measuring device electronics electrically coupled with the measurement pickup. The method includes, in such case, especially, the steps of: Allowing the medium to flow through at least one measuring tube of the measurement pickup, with the measuring tube communicating with a pipeline conveying the medium and connected to the measurement pickup; feeding an exciter signal into an exciter mechanism mechanically coupled with the measuring tube for effecting torsional oscillation of the measuring tube about a torsional oscillation axis imaginarily connecting an inlet end of the measuring tube and an outlet end of the measuring tube together; registering vibrations of the measuring tube for producing at least one oscillation measurement signal representing, at least in part, torsional oscillations of the measuring tube; as well as using the at least one oscillation measurement signal and/or the exciter signal for determining an oscillation frequency of the torsional oscillations of the measuring tube. Additionally, the method includes a step of producing a state-value representing the operating condition of the tube wall, based on the determined oscillation frequency of the torsional oscillations.

In a first embodiment of the inline measuring device of the invention, it is provided that the measuring device electronics detects, based on the determined oscillation frequency of the torsional oscillations, at least the presence of a deposit formed on the measuring tube, and/or that the measuring device electronics detects, based on the determined oscillation frequency of the torsional oscillations, an extent of the deposit formed on the measuring tube.

In a second embodiment of the inline measuring device of the invention, the measuring device electronics determines, based on the determined oscillation frequency of the torsional oscillations, at least one state-value of a first kind, which signals at least the presence of a deposit formed on the measuring tube. In a further development of this embodiment of the invention, the state-value of the first kind represents a measure, especially a thickness or a mass, of the deposit formed on the measuring tube. In another, further development of this embodiment of the invention, it is provided that the measuring device electronics determines at least the state value of a first kind also by taking into consideration a density of the medium and/or a viscosity of the medium.

In a third embodiment of the inline measuring device of the invention, it is provided that the measuring device electronics detects, based on the determined oscillation frequency of the torsional oscillations, abrasion of the measuring tube. In a further development of this embodiment of the invention, it is provided that the measuring device electronics determines, based on the determined oscillation frequency of the torsional oscillations, an extent of the abrasion present on the measuring tube.

In a fourth embodiment of the inline measuring device of the invention, the measuring device electronics determines, based on the determined oscillation frequency of the torsional oscillations, at least one state value of a second kind, which signals at least the presence of abrasion of the measuring tube. In a further development of this embodiment of the invention, the state-value of the second kind determined by the measuring device electronics represents an extent (especially a deficit in an instantaneous wall thickness of the tube wall as compared to a nominal wall thickness) of the abrasion present on the measuring tube.

In a fifth embodiment of the inline measuring device of the invention, the imagined torsional oscillation axis is directed essentially parallel to a principal axis of inertia of the measuring tube; especially, the imagined torsional oscillation axis essentially coincides with the principle axis of inertia of the measuring tube. In a further development of this embodiment of the invention, the exciter mechanism causes the measuring tube to execute, at least at times and/or at least in part, during operation, lateral oscillations, especially bending oscillations, about a lateral oscillation axis imaginarily connecting the inlet end of the measuring tube and the outlet end of the measuring tube together, especially a lateral oscillation axis directed essentially parallel to the torsional oscillation axis. In advantageous manner, the imagined lateral oscillation axis and the imagined torsional oscillation axis are, in such case, so arranged and directed with respect to one another, that they essentially coincide with one another. In another, further development of this embodiment of the invention, the exciter mechanism causes the measuring tube, during operation, to execute, alternately, torsional oscillations or lateral oscillations; or the exciter mechanism causes the measuring tube to execute, during operation, at least at times, simultaneously, torsional oscillations and lateral oscillations, so that torsional oscillations and lateral oscillations are superimposed, one on the other.

In a sixth embodiment of the inline measuring device of the invention, it is provided that the exciter mechanism causes the measuring tube, during operation, at least at times and/or at least in part, to execute lateral oscillations, especially bending oscillations, about a lateral oscillation axis imaginarily connecting the inlet end of the measuring tube and the outlet end of the measuring tube together, and that the measuring device electronics determines, on the basis of the at least one oscillation measurement signal and/or on the basis of the exciter signal, repetitively, an oscillation frequency of the lateral oscillations of the measuring tube. In a further development of this embodiment of the invention, the at least one measured value is a density measured value, which represents a density to be measured for the medium, and wherein the measuring device electronics generates the at least one measured value based on the determined oscillation frequency of the lateral oscillations. In another, further development of this embodiment of the invention, the at least one measured value is a viscosity measured-value, which represents the viscosity to be measured for the medium. Especially, the measuring device electronics determines the at least one measured value, in such case, based on a medium-dependent damping of oscillations of the measuring tube.

In a seventh embodiment of the inline measuring device of the invention, it is provided that the measuring device electronics determines, based on the determined oscillation frequency of the torsional oscillations, at least one correction value taking into consideration the deposit formed on the measuring tube, with the measuring device electronics generating the at least one measured value also using the at least one correction value.

In a first embodiment of the method, it is provided that the state-value signals at least the presence of deposit on at least one section of the tube wall.

In a second embodiment of the method, it is provided that the state-value represents a measure of the deposit formed at least sectionally on the tube wall, wherein the measure, especially, is a thickness of the deposit or a mass of the deposit.

In a third embodiment of the method, it is provided that the state-value signals at least the presence of abrasion in at least a section of the tube wall.

In a fourth embodiment of the method, it is provided that the state-value represents a measure of the abrasion present at least sectionally on the tube wall, especially a deficit in an instantaneous wall thickness of the tube wall compared to a nominal wall thickness.

In a fifth embodiment of the method, it is provided that the monitored section of the tube wall extends at least partly over the measuring tube.

In a sixth embodiment of the method, it is provided that the monitored section of the tube wall extends at least partially over the pipeline connected to the measurement pickup.

A basic idea of the invention is that, for the purpose of detecting a deposit formed on the measuring tube, especially also for the purpose of compensating measurement errors associated therewith, the measurement pickup is operated, at least at times, in a mode of oscillation, in which the measuring tube executes, at least in part, torsional oscillations, since these can, to a considerable degree, be deposit-sensitive. On the basis of at least the oscillation frequency of the torsional oscillations of the measuring tube, it is possible, in this way, to win, in very simple manner, reliable information on whether the at least one measuring tube is affected by an undesired deposit. A further basic idea of the invention is to monitor, by means of an inline measuring device of the described kind, as required, also with inclusion of a-priori existing operating experience concerning the pipeline, operating conditions of sections of the connected pipeline located upstream and downstream.

The invention rests, in such case, especially on the surprising discovery, that the eigenfrequency of natural torsional oscillations of such measuring tubes is not only influenced in considerable measure by deposits formed on the tube wall, but that also such even correspond in well reproducible manner with changes in the deposit such that extent of the deposit is measurable, at least with respect to its effective mass, based on the torsional oscillation frequency; in comparison therewith, for example, the oscillation frequencies of lateral oscillations of straight measuring tubes are dependent to a considerably lesser degree on deposits forming on the measuring tube. Slight changes in the eigenfrequencies of the torsional oscillations in such case, on occasion, accompanying changes of the viscosity of the medium can be compensated, without more, by taking into consideration the viscosity measured, in most cases, anyway, during operation, in suitable manner. Likewise, possible density dependencies of the eigenfrequencies of the torsional oscillations can be verified based on the mostly likewise determined density of the medium and/or based on the mostly likewise measured oscillation frequencies of lateral oscillations. Equally in supplementation, besides the influences of changes of primary measured values, of course, also the disturbing influences accompanying the changes of the secondary parameters mentioned above can be taken into consideration, such as e.g. temperature-fluctuation-related changes of axial stresses, and elastic and/or shear modulus.

An advantage of the invention is to be seen in, among others, the fact that the excited torsional oscillations can also serve for measuring very accurately the viscosity of the medium conveyed in the measuring tube; compare, in this connection, the above mentioned U.S. Pat. No. 4,524,610 or U.S. Pat. No. 6,840,109. A further advantage of the invention resides in the fact that, due to the mostly great similarity of measuring tube and connected pipeline, especially with regard to their flow and/or material properties, it is possible to use the deposit detection on the basis of the oscillation properties of the measuring tube also to deduce the deposit picture in the pipeline.

BRIEF DESCRIPTION OF THE DRAWINGS

The invention as well as advantageous developments thereof, will now be explained in greater detail on the basis of examples of embodiments illustrated in the figures of the drawing. Equal parts are provided in all figures with the same reference characters; when required in terms of clarity, already mentioned reference characters are omitted in subsequent figures. The figures show as follows:

FIG. 3 sectioned, in a side view, the measurement pickup of FIG. 2;

FIG. 4 a first cross sectional view of the measurement pickup of FIG. 2;

FIG. 5 a second cross sectional view of the measurement pickup of FIG. 2;

DESCRIPTION OF THE PREFERRED EMBODIMENTS

Figure 1:
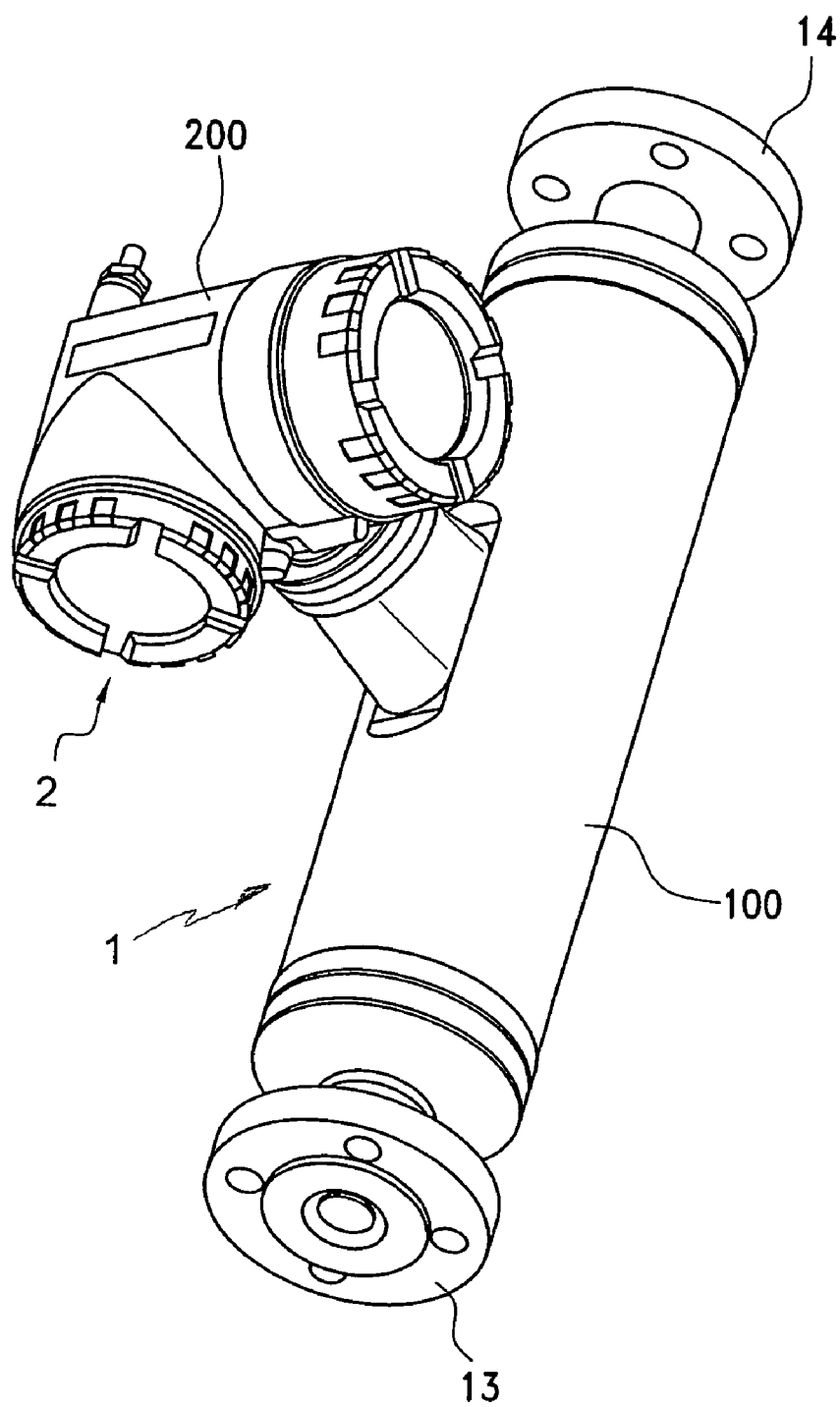
FIG. 1 an inline measuring device insertable into the course of a pipeline for measuring a mass flow of a fluid conveyed in the pipeline.

FIG. 1 shows, perspectively, an inline measuring device 1, especially a multivariable, inline measuring device, especially suited for registering one, or more, physical, measured variables, e.g. a mass flow rate m, a density $\rho$ and/or a viscosity $\rho$ of a medium flowing in a pipeline (not shown) and for reflecting such in a measured value $X_x$ instantaneously representing such, for example, a mass flow measured value $X_m$ representing mass flow, a density measured value $X\rho$ representing density $\rho$ and/or a viscosity measured value $X\eta$ representing viscosity $\eta$. The medium can be, in such case, practically any flowable substance, for example a liquid, a gas, a vapor, or the like.

Figure 6:
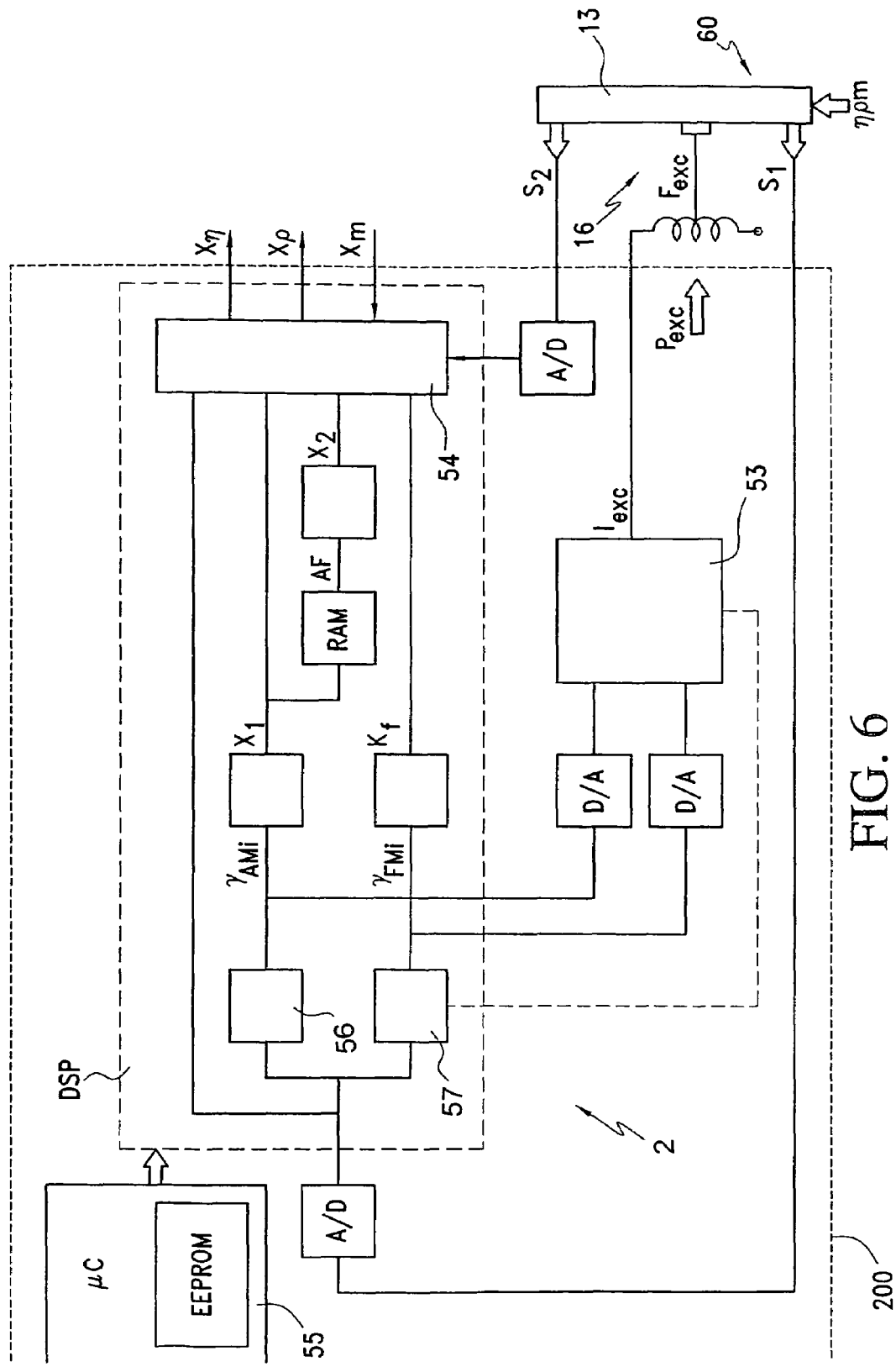
FIG. 6 schematically in the manner of a block diagram, an embodiment of a measuring device electronics suited for the inline measuring device of FIG. 1.

The inline measuring device 1, pictured, by way of example, as a Coriolis mass flow/density and/or viscosity meter, includes, for such purpose, a vibration-type, measurement pickup, or transducer, 10, through which the medium to be measured flows during operation. An example of an embodiment and developments thereof are shown in FIG. 2 to 5. FIGS. 1 and 6 show schematically, a measuring device electronics 50 electrically connected with the measurement pickup 10. Preferably, the measuring device electronics 50 is, additionally, so constructed, that it can, during operation of the inline measuring device 1, exchange measurement and/or other operational data with a measured value processing unit superordinated thereto, for example, a programmable logic controller (PLC), a personal computer and/or a workstation, via a data transmission system. Furthermore, the measuring device electronics 50 is so constructed, that it can be fed, for example, via the aforementioned field bus system, from an external energy, or power, supply. For the case, in which the vibration-type measuring device is to be connected to a field bus or other communication system, the measuring device electronics 50, especially a programmable one, includes a corresponding communications interface for communication of data, for example for transmitting the measurement data to the already mentioned, programmable logic controller or to a superordinated process control system. For accommodating the measuring device electronics 50, an electronics housing 200, especially one attached directly, externally, to, or remotely from, the measuring device electronics 50, is additionally provided.

Figure 2:
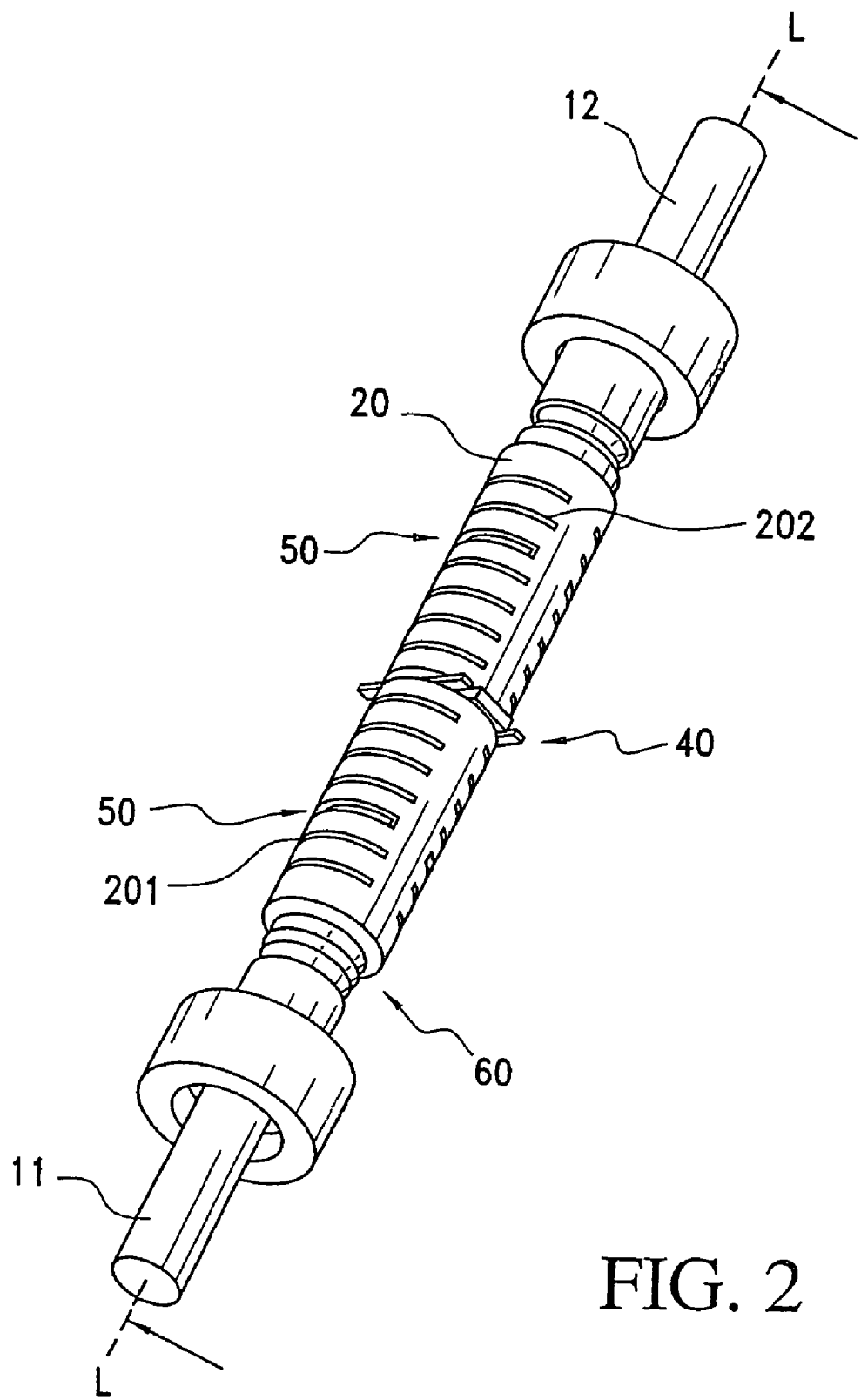
FIG. 2 in perspective, side view, an example of an embodiment of a measurement pickup, or transducer, suited for the measuring device of FIG. 1.

As already mentioned, the inline measuring device includes a vibration-type, measurement pickup, through which medium to be measured flows during operation and which serves for producing in a through-flowing medium such mechanical reaction forces reacting on the measurement pickup, especially Coriolis forces dependent on mass flow rate m, inertial forces dependent on the density ρ of the medium and/or frictional forces dependent on the viscosity η of the medium, which are measurably, especially sensorially, registerable. Based on these reaction forces characterizing the medium, it is possible for those skilled in the art to measure, in known manner, e.g. the mass flow m, density ρ and/or the viscosity η of the medium. FIGS. 2 and 3 schematically illustrate an example of an embodiment of a physical-to-electrical, transducer arrangement serving as a vibration-type measurement pickup 10. The mechanical construction and manner of functioning of such a transducer arrangement is known, per se, to those skilled in the art and is also described in detail in U.S. Pat. No. 6,691,583, WO-A 03/095949 or WO-A 03/095950.

For conveying the medium and for producing said reaction forces, the measurement pickup includes at least one, essentially straight, measuring tube 10 of predeterminable measuring tube diameter, which is caused to vibrate, at least at times, during operation and which is thereby repeatedly elastically deformed. Elastic deformation of the measuring tube lumen means here that a spatial shape and/or a spatial position of the measuring tube lumen is cyclically, especially periodically, changed, in predeterminable manner, within an elastic range of the measuring tube 10; compare, in this connection, also U.S. Pat. No. 4,801,897, U.S. Pat. No. 5,648,616, U.S. Pat. No. 5,796,011, U.S. Pat. No. 6,006,609, U.S. Pat. No. 6,691,583, WO-A 03/095949 and/or WO-A 03/095950. It is to be noted here, that, instead of the measurement pickup shown in the example of an embodiment with a single, straight, measuring tube, the measurement pickup serving for implementation of the invention can, as well, be selected from a multiplicity of vibration-type measurement pickups known from the state of the art. Especially suited are, for example, also vibration-type measurement pickups having two, essentially parallel, straight measuring tubes.

As shown in FIGS. 2 and 3, measurement pickup 1 has, additionally, a measurement pickup housing 100, which surrounds the measuring tube 10 and possible further components of the measurement pickup (see, also, further below). Housing 100 protects these from harmful, environmental influences and/or damps possible sound emissions of the measurement pickup to the environs. Beyond these functions, measurement pickup housing 100 also serves for holding an electronics housing 200, which houses the measuring device electronics 50. To this end, the measurement pickup housing is equipped with a neck-like, transition piece, to which the electronics housing 200 is appropriately affixed; compare FIG. 1. Instead of the tubular transducer housing 100 shown here, extending coaxially with the measuring tube, of course, also other, suitable, housing shapes, such as e.g. box-shaped structures, can be used.

Measuring tube 10, which communicates, in usual manner, on the inlet side and the outlet side with the pipeline, respectively supplying and carrying-away, the medium to be measured, is suspended oscillatably in the relatively rigid, especially bending- and twisting-stiff, transducer housing 100. For allowing the medium to flow through, the measuring tube 10 is connected to the pipeline via an inlet tube piece 11 opening into an inlet end 11# and via an outlet tube piece 12 opening into an outlet end 12#. Measuring tube 10, inlet and outlet tube pieces 11, 12, are directed as much aligned as possible to the above-mentioned, measuring tube longitudinal axis L and are advantageously embodied as one piece, so that e.g. a single, tubular, stock can serve for their manufacture; in case required, measuring tube 10 and tube pieces 11, 12, can, however, also be manufactured by means of single, subsequently joined, e.g. welded together, pieces of stock. For manufacture of the measuring tube 10, as well as also the inlet and outlet tube pieces 11, 12, practically any material usual for such measurement pickups can be used, such as e.g. iron-, titanium-, zirconium- and/or tantalum-alloys, plastics or ceramics. For the case, in which the measurement pickup is to be mounted releasably with the pipeline, first and second flanges 13, 14 are formed, respectively, on the inlet and outlet tube pieces 11, 12; in case required, inlet and outlet tube pieces 11, 12 can also be connected directly with the pipeline, e.g. by means of welding or brazing. Further provided affixed on the inlet and outlet end pieces 11, 12 in the measurement pickup is a transducer housing 100 accommodating the measuring tube 10.

For measuring the mass flow m and/or a density ρ, the measuring tube 10 is excited, in an embodiment of the invention, in an oscillatory, wanted mode, developed as a lateral oscillation mode. In such case, measuring tube 10 executes, at least in part, oscillations, especially bending oscillations, directed laterally to an imagined measuring tube, longitudinal axis L, especially in such a manner that it flexes laterally, to oscillate essentially at a natural, bending eigenfrequency, according to a natural, first form of eigenoscillation. For the case, in which the medium flows in the connected pipeline, so that the mass flow rate m is different from zero, Coriolis forces are induced in the through-flowing medium by means of the measuring tube 10 oscillating in the first, oscillatory, wanted mode. These forces, in turn, react on the measuring tube 10 and so effect, in manner known to those skilled in the art, an additional, sensorially registerable deformation of the measuring tube 10 essentially according to a natural, second form of eigenoscillation, which is coplanarly superimposed on the first form of eigenoscillation. The instantaneous character of the deformation of the measuring tube 10 is, in such case, especially with regard to its amplitude, also dependent on the instantaneous mass flow m. Serving as second form of eigenoscillation, the so-called Coriolis mode can involve e.g., as is usual in the case of such measurement pickups, antisymmetric forms of bending oscillation, having two, or four, oscillation antinodes. Since natural eigenfrequencies of such lateral oscillation modes of measuring tubes are, as is known, in special measure, also dependent on the density ρ of the medium, it is also possible, without more, to measure, in additional to the mass flow rate m, also the density ρ by means of the inline measuring device.

In a further embodiment of the invention, the measuring tube 10 is excited, at least at times, with a lateral oscillation frequency $f_{excL}$ for producing mass flow dependent, Coriolis forces and/or density-dependent, inertial forces in the flowing medium. This lateral oscillation frequency $f_{excL}$ corresponds, as exactly as possible, to a lowest, natural, bending, eigenfrequency of the measuring tube 10, so that, thus, the laterally oscillating measuring tube 10, which, however, does not contain fluid flowing through it, is bent outwards essentially symmetrically with reference to a central axis perpendicular to the measuring tube longitudinal axis L and, in such case, exhibits a single oscillatory antinode. This lowest, bending, eigenfrequency can, for example, lie, in the case of a high-grade steel, especially a stainless, high-grade steel, of a nominal diameter of 20 mm, a wall thickness of about 1.2 mm and a length of about 350 mm, and the usual appendages, at about 850 Hz to 900 Hz.

Additionally to the lateral oscillations, the at least one measuring tube 10, especially also for producing viscosity-dependent, shear forces in the flowing medium, is driven, at least at times, in a torsional oscillation mode. In this torsional oscillation mode, the measuring tube is excited to torsional oscillations about a torsional oscillation axis extending essentially parallel to, or coinciding with, the measuring tube longitudinal axis L, and, indeed, in such a manner, that it is twisted about its longitudinal axis L essentially according to a natural form of torsional oscillation; compare, in this connection, e.g. also U.S. Pat. No. 4,524,610, U.S. Pat. No. 5,253,533, U.S. Pat. No. 6,006,609 or EP-A 1 158 289. The exciting of the torsional oscillations can, in such case, be either in alternation with the first oscillation, wanted mode, thus separately from this, in a second oscillation, wanted mode, or else, in the case of mutually distinguishable oscillation frequencies, simultaneously with the lateral oscillations in the first oscillation, wanted mode. In other words, the measurement pickup works, at least at times, in a dual-mode operation, in which the at least one measuring tube 10 is caused to vibrate, one after the other and/or alternatingly, in at least two oscillation modes which are essentially independent of one another, namely the lateral oscillation mode and the torsional oscillation mode. In a further embodiment of the invention, the measuring tube 10 is excited, especially, simultaneously to the lateral oscillations in the wanted mode, with a torsional oscillation frequency $f_{excT}$, which corresponds as accurately as possible to a natural torsional eigenfrequency of the measuring tube 10. A lowest torsional eigenfrequency can, for example in the case of a straight measuring tube, lie about in the range of twice the lowest bending eigenfrequency.

As already mentioned, the oscillations of the measuring tube 11 are, on the one hand, damped by loss of oscillation energy, especially to the medium. On the other hand, however, oscillation energy can also be removed from the vibrating measuring tube 10 to a significant degree by the exciting of components mechanically coupled therewith likewise to oscillate, components such as e.g. the transducer housing 100 or the connected pipeline. For the purpose of suppressing or avoiding a possible loss of oscillatory energy to the environment, therefore, a counteroscillator 20 is further provided, affixed at the inlet and outlet ends of the measuring tube 10. Counteroscillator 20 can, as schematically shown in FIG. 2, be embodied as one piece. In case required, counteroscillator 20 can also be assembled as a multipart component, as disclosed in e.g. U.S. Pat. No. 5,969,265, EP-A 317 340 or WO-A 00/14485, or it can be implemented by means of two separate counteroscillation portions affixed on the inlet and outlet ends to the measuring tube 10. Counteroscillator 20 serves, among other things, for balancing the measurement pickup dynamically for at least one, predetermined density of the medium to be measured, e.g. a critical density or one expected most often during operation of the measurement pickup, to such an extent, that transverse forces and/or bending moments possibly produced in the vibrating measuring tube 10 are largely compensated; compare, in this connection, also U.S. Pat. No. 6,691,583. Moreover, the counteroscillator 20 serves for the above-described case, wherein the measuring tube 10 is excited during operation also to torsional oscillations, additionally for producing countertorsional moments for largely compensating torsional moments produced by the single, measuring tube 10 twisting preferably about its longitudinal axis L and thus for keeping the environment of the measuring tube, especially, however, the connected pipeline, largely free of dynamic, torsional moments. The counteroscillator 20 can, as shown schematically in FIGS. 2 and 3, be embodied tubularly and, for example, so connected with the measuring tube 10 on the inlet end 11# and the outlet end 12#, that it, as shown in FIG. 3, is directed essentially coaxially with the measuring tube 10. The material for the counteroscillator 20 can be practically the same materials used for measuring tube 10; thus, examples are high grade steel, especially high grade, stainless steel, titanium alloys, etc.

The counteroscillator 20, especially one which is, in comparison to the measuring tube 10, somewhat less torsionally and/or bending-elastic, is caused likewise to oscillate during operation, and, indeed, with essentially the same frequency as, yet out of phase with, especially with phase opposite to, the measuring tube 10. Accordingly, the counteroscillator 20 is tuned as accurately as possible as regards at least one of its torsional eigenfrequencies to those torsional oscillation frequencies, with which the measuring tube is mainly caused to oscillate during operation. Moreover, the counteroscillator 20 is adjusted as equally as possible also as regards at least one of its bending eigenfrequencies to at least one bending oscillation frequency, with which the measuring tube, especially in the wanted mode, is caused to oscillate, and the counteroscillator 20 is excited during operation of the measurement pickup also to lateral oscillations, especially bending oscillations, which are developed essentially coplanarly to lateral oscillations of the measuring tube 10, especially the bending oscillations of the wanted mode.

In an embodiment of the invention, grooves 201, 202, as schematically shown in FIGS. 2 and 3, are worked into the counteroscillator 20, in order, in simple manner, to enable an exact adjustment of the torsional eigenfrequencies of the counteroscillation, especially to achieve a lowering of the torsional eigenfrequencies by a lowering of a torsional stiffness of the counteroscillator 20. Although the grooves 201, 202 are shown in FIGS. 2 and 3 as being essentially uniformly distributed in the direction of the longitudinal axis L, they can, in case required, also, without more, be distributed also non-uniformly in the direction of the longitudinal axis L. Beyond this, the mass distribution of the counteroscillator can also be corrected by means of corresponding, discrete, mass-balancing elements, which are affixed to the counteroscillator 20. Examples of mass-balancing elements are metal rings pushed onto the counteroscillator 20 or small metal plates affixed to the counteroscillator.

For producing mechanical oscillation of the measuring tube 10, the measurement pickup further includes an exciter mechanism 40, especially an electrodynamic exciter mechanism, coupled to the measuring tube. Exciter mechanism 40 serves for converting an electrical exciting power $P_{exc}$ fed by the measuring device electronics in the form of a corresponding exciter signal, e.g. having an impressed exciter current $i_{exc}$ and/or a controlled voltage, into an exciter moment $M_{exc}$ acting, e.g. with pulse-shape or harmonically, on the measuring tube 10 and elastically deforming such, and/or into an exciter force $F_{exc}$ acting laterally on the measuring tube 10.

For achieving a highest possible efficiency and a highest possible signal/noise ratio, the exciter power $P_{exc}$ is adjusted as accurately as possible, so that predominantly the oscillations of the measuring tube 10 in the wanted mode are maintained, and indeed, as accurately as possible at one, or more, instantaneous eigenfrequencies of the measuring tube, through which the medium is flowing. The exciter force $F_{exc}$, as well as also the exciter moment $M_{exc}$, can, in such case, as indicated in FIG. 4, be developed, in each case, bi-directionally, or, however, also unidirectionally, and can be tuned, in manner known to those skilled in the art e.g. by means of an electrical current control circuit and/or by means of a voltage control circuit, as regards their amplitude, and, e.g. by means of a phase-locked loop, as regards their frequency. The exciter mechanism 40 can, as usual in the case of such measurement pickups of vibration-type, include, for example, a solenoid arrangement having a cylindrical exciter coil, which is secured to the counteroscillator 20 or internally on the transducer housing 100 and which is flowed through, during operation, by a corresponding exciter current $i_{exc}$, and a permanently magnetic armature, which plunges, at least partially, into the exciter coil and which is affixed to the measuring tube 10. Additionally, the exciter mechanism 40 can also be implemented, as shown e.g. in U.S. Pat. No. 4,524,610 or WO-A 03/095950, by means of a plurality of solenoids, or also by means of electromagnets.

For detecting the oscillations of the measuring tube 10, the measurement pickup further includes a sensor arrangement 50, which produces, by means of a first oscillation sensor 51 reacting to vibrations of the measuring tube 10, a first, especially analog, oscillation measurement signal 51 representing the vibrations. The oscillation sensor 51 can be in the form e.g. of a permanently magnetic armature, which is affixed to the measuring tube 10 and interacts with a sensor coil held by the counteroscillator 20 or by the transducer housing. Oscillation sensor 51 can be, especially, a type of sensor, which, based on the electrodynamic principle, registers a velocity of the deflections of the measuring tube 10. However, also acceleration-measuring, electrodynamic sensors, or, for example, distance-measuring, resistive and/or optical, sensors can be used. Naturally, also other sensors known to those skilled in the art and suitable for detection of such vibrations can be used. The sensor arrangement 60 includes, additionally, a second oscillation sensor 52, especially one which is identical to the first oscillation sensor 51. By means of sensor 52, the sensor arrangement delivers a second oscillation measurement signal $s_2$ likewise representing vibrations of the measuring tube 10. The two oscillation sensors 51, 52 are, in the measurement pickup of this embodiment, so spaced from one another along the measuring tube, especially at equal distances from the half-way point of the measuring tube 10, that, by means of sensor arrangement 50, both inlet-side and outlet-side vibrations of the measuring tube 10 are locally registered and transformed into the corresponding oscillation measurement signals $s_1$ and $s_2$, respectively. Both oscillation measurement signals $s_1$, $s_2$, which usually exhibit, in each case, an oscillation frequency corresponding to an instantaneous oscillation frequency of the measuring tube 10, are, as shown in FIG. 6, fed to the measuring device electronics 50, where they are, in manner known to those skilled in the art, preprocessed, especially digitized, and subsequently suitably exploited.

In an embodiment of the invention, the exciter mechanism 40 is so embodied and arranged in the measurement pickup, as shown in FIGS. 2 to 4, that it acts, during operation, simultaneously, especially differentially, on both the measuring tube 10 and on the counteroscillator 20. In the case of this further development of the invention, the exciter mechanism 40 is, as shown in FIG. 2, advantageously so embodied and so arranged in the measurement pickup, that, during operation, it acts simultaneously, especially differentially, on the measuring tube 10 and on the counteroscillator 20. In the example of an embodiment shown in FIG. 4, the exciter mechanism 40 has, for such purpose, at least a first exciter coil 41a, through which an exciter current, or an exciter current component, flows, at least at times, during operation. Coil 41a is affixed to a lever 41c connected with the measuring tube 10. Via the lever and an armature affixed externally to the counteroscillator 20, the exciter mechanism 40 acts differentially on the measuring tube 10 and the counteroscillator 20. This arrangement has, among other things, also the advantage that, on the one hand, the counteroscillator 20 and, thus, also the transducer housing 100 is kept small in cross section and, in spite of this, the exciter coil 41a is easily accessible, even in the case of assembly. Moreover, a further advantage of this embodiment of the exciter mechanism 40 is that possibly used coil-cups 41d, especially coil-cups, which, at nominal diameters of more than 80 mm, are no longer negligibly heavy, can likewise be affixed to the counteroscillator 20 and then have practically no influence on the eigenfrequencies of the measuring tube 10. It is, however, to be noted here that, in case required, the exciter coil 41a can also be held by the counteroscillator 20 and, in turn, the armature 41b can be held by the measuring tube 10.

In corresponding manner, the oscillation sensors 51, 52 can be so designed and arranged in the measurement pickup that they differentially register the vibrations of measuring tube 10 and counteroscillator 20. In the example of an embodiment shown in FIG. 5, the sensor arrangement 50 includes a sensor coil 51a affixed to the measuring tube 10, here outside of all principle axes of inertia of the sensor arrangement 50. Sensor coil 51a is arranged as close as possible to an armature 51b affixed to the counteroscillator 20 and so coupled magnetically with the armature, that a variable measurement voltage is induced, which is influenced by rotational and/or lateral, relative movements changing the relative position and/or relative separation between measuring tube 10 and counteroscillator 20. On the basis of such an arrangement of the sensor coil 51a, it is possible to register, in advantageous manner, both the above-discussed, torsional oscillations, as well as also the excited bending oscillations. In case required, sensor coil 51a can, however, also be affixed to the counteroscillator 20, and, in turn, the armature 51b coupled with such can be affixed to the measuring tube 10.

In another embodiment of the invention, measuring tube 10, counteroscillator 20, and the exciter mechanism 40 and sensor arrangement 50 secured thereto, are so matched to one another with regard to their mass distribution, that the so-formed, measurement-pickup, inner-part, suspended by means of the inlet and outlet tube pieces 11, 12, has a center of mass MC, which lies at least within the measuring tube 10 and preferably as near as possible to the longitudinal axis L of the measuring tube. Additionally, the inner part is, in advantageous manner, so embodied that it has a first principal axis of inertia T1 lying aligned with the inlet tube piece 11 and the outlet tube piece 12 and at least sectionally within the measuring tube 10. Due to the displacement of the center of mass MC of the inner part, especially, however also due to the aforementioned position of the first principal axis of inertia T1, the two oscillation forms assumed operationally by the measuring tube 10 and largely compensated by the counteroscillator 20, namely the torsional oscillations and the bending oscillations of the measuring tube 10, are, as far as possible, mechanically decoupled from one another; compare, in this connection, also U.S. Pat. No. 6,840,109. In this way, both oscillation forms, thus the lateral oscillations and/or the torsional oscillations, can, in advantageous manner, without more, be excited separately from one another. Both the displacement of the center of mass MC and also of the first principle axis of inertia T1 toward the longitudinal axis L of the measuring tube can, for example, be considerably simplified by so embodying and arranging the inner part, thus measuring tube 10, counteroscillator 20 and the exciter mechanism 40 and sensor arrangement, that a mass distribution of the inner part along the longitudinal axis L of the measuring tube is essentially symmetrical, at least, however, invariant in the face of an imagined rotation about the longitudinal axis L of the measuring tube by 180° (c2-symmetry). Additionally, the counteroscillator 20 (here embodied tubularly, especially also largely axially symmetrically) is arranged essentially coaxially with the measuring tube 10, whereby the achievement of a symmetrical mass distribution of the inner part is considerably simplified and, consequently, also the center of mass MC is, in simple manner, shifted to be near to the longitudinal axis L of the measuring tube. Moreover, the exciter mechanism 40 and the sensor arrangement 50 are, in the example of an embodiment, so embodied and so arranged with respect to one another on the measuring tube 10 and, as required, on the counteroscillator 20, that a mass moment of inertia produced by them is kept as concentric as possible to the longitudinal axis L of the measuring tube or at least as small as possible. This can be achieved e.g. by keeping a common center of mass of exciter mechanism 40 and sensor arrangement 50 as close as possible to the longitudinal axis L of the measuring tube and/or by keeping a total mass of exciter mechanism 40 and sensor arrangement 50 as small as possible.

In a further embodiment of the invention, the exciter mechanism 40 is, for the purpose of separate exciting of torsional and/or bending oscillations of the measuring tube 10, so embodied and so affixed to such and to the counteroscillator 20, that a force producing the bending oscillations acts on the measuring tube 10 along an imagined force line extending outside of a second principle axis of inertia T2 perpendicular to the first principal axis of inertia T1, or cuts the second principal axis of inertia T2 in at most, one point. Preferably, the inner part is so embodied that the second principal axis of inertia T2 corresponds essentially with the above-mentioned central axis. In the example of an embodiment shown in FIG. 4, the exciter mechanism 40 has, for such purpose, at least a first exciter coil 41a, through which the exciter current, or an exciter current component, flows, at least at times, during operation. The first exciter coil 41a is affixed to a lever 41c connected with the measuring tube 10 and acts via the lever 41c and an armature 41b affixed externally to the counteroscillator 20, differentially on the measuring tube 10 and on the counteroscillator 20. This arrangement has, among other things, also the advantage, that, on the one hand, the counteroscillator 20 and, thus, also the transducer housing 100 can be kept small in cross section, and, in spite of this, the exciter coil 41a is easily accessible, especially also in the case of the assembly. Moreover, a further advantage of this embodiment of the exciter mechanism 40 is that possibly used, coil cups 41d, especially ones, which, at nominal diameters of more than 80 mm, are no longer negligibly heavy, can likewise be affixed to the counteroscillator 20 and, thus, have practically no influence on the resonance frequencies of the measuring tube. It is to be noted here that, in case required, the exciter coil 41a can also be held by the counteroscillator 20 and, correspondingly, the armature 41b can be held by the measuring tube 10.

In another embodiment of the invention, the exciter mechanism 40 has at least a second exciter coil 42a arranged along a diameter of the measuring tube 10 and coupled with the measuring tube 10 and the counteroscillator 20 in the same way as the exciter coil 41a. In another embodiment of the invention, the exciter mechanism has two more (thus, in total, four) exciter coils 43a, 44a arranged symmetrically at least with reference to the second principal axis of inertia T2 and also mounted in the measurement pickup in the aforementioned manner. The force acting on the measuring tube 10 outside of the second principal axis of inertia T2 can be produced by means of such two-, or four-, coil arrangements, in simple manner, e.g. by providing one of the exciter coils, e.g. the exciter coil 41a, with another inductance than that given, in each case, to the other, or by causing one of the exciter coils, e.g. the exciter coil 41a, to be flowed through during operation by an exciter current component, which is different from an instantaneous exciter current component of, in each case, the other exciter coils.

In another embodiment of the invention, the sensor arrangement 50 includes, as shown schematically in FIG. 5, a sensor coil 51a affixed to the measuring tube 10 and arranged outside of the second principal axis of inertia T2. Sensor coil 51a is arranged as close as possible to an armature 51b affixed to the counteroscillator 20 and so coupled magnetically with such armature, that a variable measurement voltage is induced as a function of rotational and/or lateral, relative movements between measuring tube 10 and counteroscillator 20, as they change their relative positions and/or their relative separation. Due to the arrangement of the sensor coil 51a according to the invention, it is possible, in advantageous manner, to register both the above-defined, torsional oscillations and also the possibly excited bending oscillations. In case required, the sensor coil 51a therefor can, however, also be affixed to the counteroscillator 20 and, in corresponding manner, the armature 51b coupled therewith can be affixed to the measuring tube 10.

It is to be noted here, additionally, that the exciter mechanism 40 and the sensor arrangement 50 can be embodied essentially equally in their mechanical constructions, in manner known to those skilled in the art; thus, the aforementioned embodiments of the mechanical construction of the exciter mechanism 40 can be essentially transferred also to the mechanical construction of the sensor arrangement 50, and vice versa.

For causing measuring tube 10 to vibrate, the exciter mechanism 40 is, as already mentioned, fed by means of an also oscillating, exciter current $i_{exc}$, especially one containing a plurality of frequencies, of adjustable amplitude and adjustable exciter frequency $f_{exc}$, in such a manner that the electrical current flows through the exciter coils 26, 36 during operation and the magnetic fields required for moving the armatures are produced. The exciter current $i_{exc}$ can be e.g. harmonic, of plural frequencies, or also rectangular. The lateral oscillation exciter frequency $f_{excL}$ of a lateral current portion $i_{excL}$ of the exciter current $i_{exc}$ required for maintaining the lateral oscillations of the measuring tube 10 can, in the case of the measurement pickup shown in the example of an embodiment, be so selected and adjusted, in advantageous manner, that the laterally oscillating measuring tube 10 oscillates essentially in a bending oscillation, fundamental mode having a single oscillation antinode. Analogously thereto, also a torsional oscillation exciter frequency $f_{excT}$ of a torsional current portion $i_{excT}$ of the exciter current $i_{exc}$ required for maintaining the torsional oscillations of the measuring tube 10 is, in advantageous manner, so selected and adjusted that the torsionally oscillating measuring tube 10 oscillates as much as possible in its torsional oscillation, fundamental mode with a single oscillation antinode. The two aforementioned, electrical current portions $i_{excL}$ and $i_{excT}$ can, depending on the selected type of operation, be fed into the exciter mechanism 40, for example, intermittently, thus momentarily each, in turn, acting as the exciter current $i_{exc}$, or also simultaneously, thus combined together to form the exciter current $i_{exc}$.

For the above-described case, in which the lateral oscillation frequency $f_{excL}$ and the torsional oscillation frequency $f_{excT}$, with which the measuring tube is caused, during operation, to oscillate, are set differently from one another, it is possible, in simple and advantageous manner, by means of the measurement pickup, to obtain a separation of the separate oscillation modes both in the exciter signals and also in the sensor signals, even in the case of simultaneously excited, torsional and bending oscillations, e.g. based on a signal filtering or a frequency analysis. Alternatively, an alternating excitation of the lateral and torsional oscillations can be used.

For producing and adjusting the exciter current $i_{exc}$, or the electrical current portions $i_{excL}$, $i_{excT}$, the measuring device electronics 50 includes a corresponding driver circuit 53, which is controlled by a lateral oscillation frequency adjusting signal $y_{FML}$ representing the desired lateral oscillation exciter frequency $f_{excL}$ and by a lateral oscillation amplitude adjusting signal $y_{AML}$ representing the desired lateral oscillation amplitude of the exciter current $i_{exc}$ and/or the lateral current portion $i_{excL}$, as well, at least at times, by a torsional oscillation frequency adjusting signal $Y_{FMT}$ representing the desired torsional oscillation exciter frequency $f_{excT}$ and by a torsional oscillation adjusting signal $y_{AMT}$ representing the desired torsional oscillation amplitude of the exciter current $i_{exc}$ and/or the torsional electrical current portion $i_{excT}$. Driver circuit 53 can be implemented e.g. by means of a voltage-controlled oscillator and a downstream-connected voltage-to-current converter; instead of an analog oscillation, however, it is also possible to use e.g. a numerically controlled, digital oscillation for the setting of the instantaneous exciter current $i_{exc}$ or the portions $i_{excL}$, $i_{excT}$ of the exciter current.

For producing the lateral oscillation amplitude adjusting signal $y_{AML}$ and/or torsional oscillation amplitude adjusting signal $y_{AMT}$, e.g. an amplitude control circuit 51 integrated into the measuring device electronics 50 can be used. Amplitude control circuit 51 updates on the basis of instantaneous amplitudes of at least one of the two oscillation measurement signals $s_1$, $s_2$, measured at the instantaneous lateral oscillation frequency and/or at the instantaneous torsional oscillation frequency, as well as on the basis of corresponding, constant or variable, amplitude reference values $W_B$, $W_T$ for the lateral and/or torsional oscillations; as required, also instantaneous amplitudes of the exciter current $i_{exc}$ can be referenced for generating the lateral oscillation amplitude adjustment signal $y_{AML}$ and/or the torsional oscillation amplitude adjustment signal $y_{AMT}$. Construction and manner of operation of such amplitude control circuits are likewise known to those skilled in the art. An example of such an amplitude control circuit is that contained in the measurement transmitter of the series "PROMASS 83", such as sold by the assignee, for example, in connection with the measurement pickups of the "PROMASS I". Their amplitude control circuit is, for example, so embodied, that the lateral oscillations of the measuring tube 10 are controlled to a constant amplitude, thus to an amplitude also independent of the density ρ.

For producing the lateral oscillation frequency adjusting signal $Y_{FMZ}$ and/or torsional oscillation frequency adjusting signal $Y_{FMT}$, e.g., a frequency control circuit 57 integrated into the measuring device electronics 50 may be used.

The frequency control circuit 52 and the driver circuit 53 can be embodied e.g. as a phase control loop, which is used, in manner known to those skilled in the art, to adjust the lateral oscillation frequency adjusting signal $y_{FML}$ and/or the torsional oscillation frequency adjusting signal $y_{FMT}$ continuously to the instantaneous eigenfrequencies of the measuring tube 10 on the basis of a phase difference measured between at least one of the oscillation measurement signals $s_1$, $s_2$ and the desired, or the instantaneously measured, exciter current $i_{exc}$. The construction and use of such phase-locked loop controls for the driving of measuring tubes to one of their mechanical eigenfrequencies is described in detail e.g. in U.S. Pat. No. 4,801,897. Of course, also other frequency control circuits known to those skilled in the art can be used, such as e.g. those described in U.S. Pat. No. 4,524,610 or U.S. Pat. No. 4,801,897. Additionally, regarding an application of such frequency control circuits for measurement pickups of vibration-type, reference is made to the already mentioned measurement transmitters of the series "PROMASS 83". Other circuits suited for use as driver circuits can also be found, for example, in U.S. Pat. No. 5,869,770 or U.S. Pat. No. 6,505,519.

In a further embodiment of the invention, the amplitude control circuit 51 and the frequency control circuit 52 are implemented, as schematically indicated in FIG. 6, by means of a digital signal processor DSP provided in the measuring device electronics 50 and by means of a program code implemented, and running, therein. The program code can be stored persistently or also permanently in a non-volatile memory EEPROM of a microcomputer 55 driving and/or monitoring the signal processor, and loaded, upon the starting of the signal processor DSP, into a volatile data memory RAM of the measuring device electronics 50 integrated e.g. in the signal processor DSP. Signal processors suitable for such applications include e.g. type TMS320VC33, which is a product available from the firm Texas Instruments Inc. Naturally, the oscillation measurement signals $s_1$, $s_2$ are to be converted for a processing in the signal processor DSP into corresponding digital signals by means of corresponding analog-to-digital converters A/D; compare, in this connection, especially EP-A 866 319. In case required, adjusting signals output by the signal processor, such as e.g. the amplitude adjusting signals $y_{AML}$, $y_{AMT}$, or the frequency adjusting signals $y_{FML}$, $y_{FMT}$, are, as required, to be converted in corresponding manner, from digital, to analog, form.

As shown in FIG. 6, the oscillation measurement signals $s_1$, $s_2$, which are, to the extent required by the application, suitably conditioned, and then fed to a measurement circuit 21 of the measuring device electronics, which serves for producing the at least one measured value $X_x$ on the basis of at least one of the oscillation measurement signals $s_1$, $s_2$ and/or on the basis of the exciter current $i_{exc}$.

In an embodiment of the invention, measuring circuit 21 is embodied, at least in part, as a flow calculator and the measuring circuit serves, in manner, per se, known to those skilled in the art, for determining, on the basis of a phase-difference detected between the oscillation measurement signals $s_1$, $s_2$ generated in the case of a measuring tube oscillating, at least in part, laterally, a measured value of a first kind serving here as mass-flow, measured-value $X_m$ and representing, as accurately as possible, the mass flow m to be measured. The measuring circuit 21 can be one already used and established, in such case, in conventional Coriolis mass flow measuring devices, especially digital measuring circuits, which determine mass flow rate on the basis of the oscillation measurement signals $s_1$, $s_2$; compare, in this connection, especially the initially mentioned WO-A 02/37063, WO-A 99/39164, U.S.

Pat. No. 5,648,616, U.S. Pat. No. 5,069,074. Of course, also other measuring circuits known to those skilled in the art to be suited for Coriolis mass flow measuring devices can be used, such as those which measure and correspondingly evaluate the phase, or time, differences between oscillation measurement signals of the described kind. Additionally, the measuring circuit 21 can also serve for generating a measured value of a second kind usable as a density measured value $X\rho$, derived, for example, from an oscillation frequency of lateral oscillations of the at least one measuring tube, as measured on the basis of at least one of the oscillation measurement signals $s_1$, $s_2$ and instantaneously representing a density $\rho$ to be measured for the medium. As a result of the fact that the straight measuring tube 10, as described above, is caused, during operation, to execute simultaneously or alternatingly, lateral and torsional oscillations, the measuring circuit 21 can also be used further for determining a measured value of a third kind usable as a viscosity measured value $X\eta$ and instantaneously representing a viscosity of the medium, as derived form the exciter current $i_{exc}$, which, as is known, can serve as a measure for an apparent viscosity or also a viscosity-density product; compare, in this connection, also U.S. Pat. No. 4,524,610, WO-A 95 16 897 or U.S. Pat. No. 6,651,513.

It is, in such case, without more, clear for those skilled in the art, that the inline measuring device can determine the individual measured values $X_x$ [$X_m$, $X\rho$, $X\eta$ . . . ] for the various measured variables x [m, $\rho$, $\eta$ . . . ] both, in each case, with a common measurement cycle, thus with equal update rates, as well as also with differing update rates. For example, a highly accurate measuring of the, most often, significantly varying, mass flow rate m requires, usually, a very high update rate, while, in comparison therewith, the, for the most part, less variable viscosity $\eta$ of the medium can, as required, be updated over greater intervals of time over a longer period of time. Additionally, it is possible, without more, to assume, that currently determined, measured values $X_x$ can be intermediately stored in the measuring device electronics and thus be kept for subsequent uses. In advantageous manner, the measuring circuit 21 can, additionally, also be implemented by means of the signal processor DSP.

Figure 7:
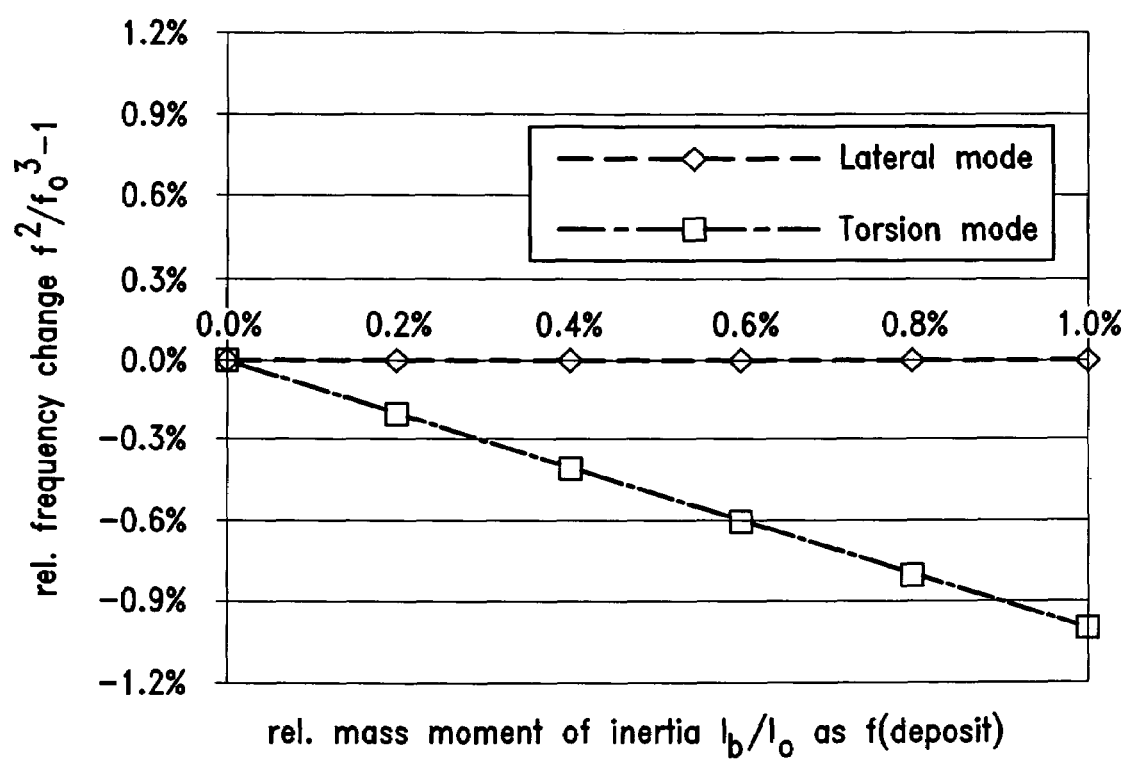
FIG. 7 graphically, measurement data experimentally determined with an inline measuring device according to the FIGS. 1 to 6.

As already initially mentioned, deposits on the tube walls depositing, for example, because of sedimentation processes, as well as also abrasion occurring on the tube wall, can lead to corrupting of the measurement results of inline measuring devices. While, in the case of inline measuring devices with vibration pickups, primarily changes in the tube wall of the measuring tube itself influence the accuracy of measurement, likewise, in the case of inline measuring devices, unrecognized changes at the tube wall of the pipeline conveying the medium, dependent to a high degree on the flow profile, can cause significant errors in measurement. Surprisingly, it has, however, been found, that, in the case of measurement pickups of vibration type, a deposit formed on the tube wall of the measuring tube influences, especially, the natural torsional eigenfrequencies, and, to such extent, also the torsional oscillation frequency $f_{excT}$, with which the measuring tube is excited, while the natural lateral eigenfrequencies can remain almost uninfluenced; compare, in this connection, also FIG. 7. Equally sensitive is the torsional oscillation frequency $f_{excT}$, however, also relative to changes of the tube wall of the measuring tube caused by other factors, for example losses of material as a result of abrasive media in the measuring tube.

In the case of deposit formation, this can be graphically explained by the fact that, on the one hand, it is true, the density $\rho_D$ of the deposit D is, as averaged over time, essentially equal to an equally determined density of the medium and, to such extent, the lateral oscillation frequency $f_{excL}$ is not, to any special degree, sensitive for such deposits forming on the measuring tube, while, on the other hand, the thickness of the tube wall is effectively increased by the deposit D, and, in this way, a mass moment of inertia of the measuring tube about the principal axis of inertia is significantly changed. In the case of abrasion phenomena on the measuring tube, in turn, the sinking of the instantaneous torsional eigenfrequencies of the measuring tube, in each case, accompanying therewith, is so marked in comparison to the initially set torsional eigenfrequencies in the case of a new measuring device, that, at least in the torsional fundamental mode, a subceeding, or falling beneath, of an initially determined, lowest plausible torsional oscillation frequency can serve as a very robust indicator for abrasion on the measuring tube. Consequently, in the case of the inline measuring device of the invention, it is further provided that the measuring device electronics 2 monitors, based on the repetitively determined oscillation frequency, $f_{excT}$, of the excited torsional oscillations, an operating condition of the at least one measuring tube, especially deposit build-up and/or abrasion of the measuring tube, and, as required, takes the result of this monitoring into consideration also during the determining of the particular measured value $X_x$. The operating condition of the measuring tube can, in such case, be quantified e.g. in simple manner on the basis of a relative change $$\frac{f_{excT}^2}{f_{excT,0}^2} - 1,$$

or, in simplified, linearized form $$\frac{f_{excT}}{f_{excT,0}} - 1 \quad (1)$$

of the torsional oscillation frequency $f_{excT}$ relative to a reference oscillation frequency $f_{excT, 0}$, which is set initially for a given measurement pickup with a measuring tube lacking deposits, in order to provide a state value representing the operating condition of the measuring tube. Instead of a quasi direct measurement of the torsional oscillation frequency $f_{excT}$ on the basis of at least one of the oscillation measurement signals $s_1$, $s_2$, the instantaneous torsional oscillation frequency $f_{excT}$ can also be measured, for example, from the exciter signal instantaneously fed into the exciter mechanism and/or quasi indirectly on the basis of the mentioned torsional oscillation frequency adjustment signal $y_{FMT}$.

In an embodiment of the invention, the measuring device electronics 2 therefor is structured to determine a measure, especially an effective mass $m_D$ and/or an average thickness $t_D$, of a deposit D formed on the measuring tube, at least, however, to detect the presence of the deposit D formed on the measuring tube. In a further development of this embodiment of the invention, it is further provided that the measuring device electronics determines, based on the determined oscillation frequency $f_{excT}$ of the torsional oscillations, a state value $S_D$ (for instance one giving an alarm) of a first kind, which at least signals the presence of a deposit D formed on the measuring tube. By way of example, for this purpose, a deposit measured value $X_D$ measured for the deposit and determined on the basis of the oscillation frequency $f_{excT}$ can be compared with one, or also more, initially set, plausible limit values, and the state value $S_D$ can be converted from a first signal level to a second signal level, when the deposit measured value $X_D$ correspondingly exceeds a limit value set therefor. For the case in which the deposit measured value $X_D$ is to serve, for example, as a measure for the effective mass $m_D$ of the deposit D, an essentially linear relationship between the instantaneously determined oscillation frequency $f_{excT}$ and the effective mass $m_D$ can (at least under the assumption that an essentially homogeneous deposit D exists, which is essentially uniformly distributed over the measuring tube) be very simply represented with the following mathematical relationship:

$$X_D = K_D \cdot \left( \frac{f_{excT}^2}{f_{excT,0}^2} - 1 \right) \quad (2)$$

At least for media, which, with regard to their temperature $\theta$, their density $\rho$ and their viscosity $\eta$, remain essentially constant, the coefficient $K_D$ is also practically a constant, which can be correspondingly calibrated before or during installation of the inline measuring device and appropriately stored in the measuring device electronics digitally in the form of a constant $K_{D,0}$. However, it can be necessary, for the purpose of improving the accuracy, with which the deposit measured value $X_D$, for example the effective mass $m_D$, or a variable derived therefrom, is to be represented, to modify the coefficient $K_D$, by means of at least one of the operating parameters, such as e.g. measuring tube temperature, lateral oscillation frequency $f_{excL}$, the lateral oscillation amplitude, the exciter current amplitude, etc., usually measured and/or controlled anyway during operating of inline measuring devices of the described kind, for the possibly changing characteristics of the medium, especially the instantaneous temperature $\theta$, density $\rho$ and/or viscosity $\eta$.

Especially, it has been found, in such case, that the deposit measured value $X_D$ determined according to Equation (2) can be made largely independent by using the density measured value $X\rho$ and the viscosity measured value $X\eta$ of the medium conveyed instantaneously in the at least one measuring tube:

$$X_D = K_D \cdot \left( \frac{f_{excT}^2}{f_{excT,0}^2} - 1 \right) - K_{D,0} \cdot \sqrt{(X_\rho \cdot X_\eta)}. \quad (3)$$

The density measured value $X\rho$ can, as already mentioned, be calculated in the measuring device electronics, for example, based on the lateral oscillation frequency $f_{excL}$ determined usually in the operation of inline measuring devices of the described kind and/or e.g. on the basis of the lateral oscillation frequency adjustment signal $y_{FML}$. Equally known, per se, is also the determination of the viscosity measured value $X\eta$ by means of an inline measuring device of the described kind, for example on the basis of the torsional electrical current portion $i_{excT}$, also taking into consideration, as required, the torsional oscillation- and/or lateral oscillation-amplitude; compare, in this connection, for example also the initially mentioned U.S. Pat. No. 6,840,109, U.S. Pat. No. 4,524,610 or US-A 2004/0200268. Alternatively or in supplementation, for the viscosity of the medium, for example, also the damping of the oscillations of the measuring tube, especially the torsional oscillations, caused by the medium located in the measuring tube, can be correspondingly taken into consideration in the determining of the deposit measured value $X_D$.

In another embodiment of the invention, it is further provided to determine the deposit measured value $X_D$ in a manner such that it can serve as a measure for an instantaneous thickness $t_D$ of the deposit formed on the measuring tube. This can occur, for example, through a slight modification of the above Equation (2), by taking into consideration a density $\rho_D$ of the deposit D correspondingly in the calculation during determining of the deposit measured value $X_D$. This, can be implemented e.g. by, in the case of essentially constant process conditions, especially in the case of media having essentially constant properties, bringing the initially determined density $\rho_D$ of the deposit D directly into the calibration constant $K_{D,0}$ which is stored as a constant.

In another embodiment of the invention, for the purpose of improving the accuracy, with which the deposit D is estimated, it is, however, further provided that the mentioned coefficient $K_D$ for the determining of the deposit measured value $X_D$ is repetitively updated by means of an updated estimated value $\hat{\rho}_D$ for the instantaneous deposit density $\rho_D$, in order to match it as well as possible to the actual conditions in the measuring tube. Correspondingly, the coefficient $K_D$ used for the implementation of Equation (2) is to be modified as follows:

$$K_D = \frac{K_D'}{\hat{\rho}_D}. \quad (4)$$

Serving as the estimated value $\hat{\rho}_D$, in such case, is, for example, a characterizing value based on process experience and/or process histories. The characterizing value is correspondingly determined by the superordinated, measured-value processing unit and transmitted to the inline measuring device via a field bus system. Alternatively or in supplementation thereto, the estimated value $\hat{\rho}_D$ can, however, also be determined directly in the measuring device electronics on the basis of measured operational parameters, for example on the basis of a multiplicity of density measured values $X\rho$ and/or viscosity measured values $X\eta$, stored and/or averaged over a longer period of time.

The above-defined mathematical functions, symbolized by the Equations (2) to (4), serving for producing the deposit measured value $X_D$ and/or the coefficient $K_D$, can be implemented, at least partially, by means of the signal processor DSP or e.g. also by means of the above-mentioned microcomputer 55. The Creation and implementation of corresponding algorithms, which match the aforementioned equations and which mirror the functioning of the amplitude control circuit 51, or the frequency control circuit 52, as the case may be, as well as their transformation into program code executable in such signal processors are subjects, per se, within the ability of those skilled in the art and require, therefore, at least once one has knowledge of the present invention, no detailed explanation. Of course, the above-defined equations can also, without more, be represented completely or partially by means of corresponding, discretely assembled, analog and/or digital, calculative circuits in the measuring device electronics 50.

In a further embodiment of the invention, the measuring device electronics 2 is provided for determining an extent of an abrasion A present on the measuring tube, at least, however, for detecting the presence of abrasion on the measuring tube. In a further development of this embodiment of the invention, it is further provided that the measuring device electronics determines, based on the determined oscillation frequency $f_{excT}$ of the torsional oscillations, a state value $S_A$ of a second kind, for example one giving an alarm and signaling the presence of abrasion on the measuring tube. By a corresponding calibration of the measuring device electronics 2, the so-determined, state value $S_A$ of the second kind can, in such case, be determined such that it serves as an abrasion, measured value XA, representing an extent of the abrasion present on the measuring tube, especially a deficit in an instantaneous wall thickness of the tube wall of the measuring tube relative to a nominal wall thickness.

Considering that, in rather more rare cases, applications are to be handled, in which both a marked deposit formation as well as also equally significant instances of abrasion are to be expected on tube walls, the oscillation frequency $f_{excT}$ of the excited torsional oscillations can, by taking into consideration related additional information concerning the particular application, quite appropriately be viewed as an unequivocal indicator for deposit formation or abrasion. This is appropriate, at least after a certain degree of abrasion, practically in every case, since any further abrasion leads to such a significant sinking of the considered eigenfrequencies of the torsional oscillations that it is no longer plausible to attribute such to deposit formation. Accordingly, it is provided in a further embodiment of the invention that there is stored in the measuring device electronics a first state limit value $L_A$ for the measured oscillation frequency $f_{excT}$, at the subceeding, or falling beneath, of which by the measured oscillation frequency $f_{excT}$ an alarm is emitted by the measuring device electronics signaling an increased abrasion. Further, a second state limit value $L_{A/D}$ is stored in the measuring device electronics, which represents a torsional oscillation frequency, which is higher than that represented by the first state limit value $L_A$. At a subceeding of, or falling beneath, this second state limit value $L_{A/D}$, the measuring device electronics issues, for the case in which the inline measuring device is being used in an application tending toward increased deposit, an alarm signaling a beginning or progressing deposit formation; for the case in which the inline measuring device is being used in an application tending toward increased abrasion, then, correspondingly, an alarm signaling a beginning or progressing abrasion is issued.

According to a further embodiment of the invention, the measuring device electronics estimates predictively a remaining run time for the inline measuring device or at least for the measuring tube, on the basis of a multiplicity of digital data values for the measured oscillation frequency $f_{excT}$ stored over a longer period of operation and/or time-averaged, and/or on the basis of a multiplicity of digital data values for state values indicating the operating condition of the at least one measuring tube.

By including operating experience concerning the particular plant and the media, in each case, conveyed therein, it is possible, starting from the operating condition of the at least one measuring tube determined in the above-described manner first for the monitoring of the inline measuring device itself, to deduce an instantaneous and/or predicted operating condition at least of selected sections of the pipeline connected to the inline measuring device, especially concerning those pipe walls, which are contacted, during operation, by the medium flowing in the inline measuring device. In accordance therewith, in a further embodiment of the invention, it is provided that, based on the oscillation frequency, $f_{excT}$, of the torsional oscillations, additionally an operating condition at least of a chosen section of the pipeline extending at least in part also over the pipeline connected to the inline measuring device is monitored by means of the measuring device electronics. Accordingly, the evaluation methods used for the determining of the above-mentioned state values $S_A$ and/or $S_D$ can be so modified, that the operating experience correspondingly taking into consideration the abrasion- and/or deposit-behavior of the pipeline is caused to flow into the calculations of the state values $S_A$ and/or $S_D$ resting on the oscillating frequency $f_{excT}$, for example in the form of a correspondingly time-varying, as required event-controlled, coefficient $K_D(t)$ in Equations (2), (3) and/or (4). Accordingly, the measuring device electronics determines, in a further embodiment of the invention, the state values $S_A$ and/or $S_D$, in the manner that the relevant, in each case, selected section of the pipe wall corresponds, at least not exclusively, to the tube wall of the measuring tube, but, at least partly, also to a section of the pipe wall of the pipeline which is conveying the medium to be measured by means of the inline measuring device. Correspondingly, the state value $S_D$ of the first kind can signal at least the presence of deposit in the pipeline and the state value $S_A$ of the second kind can signal at least the presence of abrasion in the pipeline. Moreover, the state value $S_D$ of the first kind can, however, also indicate the extent of the deposit formation in the pipeline, for example regarding the thickness of the deposit or the mass of the deposit, or the state value $S_A$ of the second kind can represent the extent of the abrasion present at least sectionally on the pipe wall, especially a deficit in an instantaneous wall thickness of the pipe wall relative to a nominal wall thickness.

Although in the case of inline measuring devices of the described kind having a measurement pickup of vibration-type, deposits forming on the measuring tube have mostly only a rather slight influence on the accuracy of measurement, with which the mass flow rate m is determined, nevertheless such deposits can have a quite significant influence on the accuracy of measurement with which, for example, the density $\rho$ and/or the viscosity $\eta$ is/are determined. Equally, in the case of inline measuring devices of the described kind, abrasion phenomena can lead to increased errors in measurement, at least, here, especially also in the case of the determining of the mass flow rate m. Generally, therefore, it can be assumed, that deposit formation, as well as also abrasion phenomena can lead thereto, that measured value determined in conventional manner under the assumption of an unchanged measuring tube, will not agree sufficiently accurately with the actual measured variable x, for example the actual density $\rho$, so that, thus, the measured value must be accordingly corrected.

In accordance therewith, in a further embodiment of the invention, the measuring device electronics 2 generates, in conventional manner, a measured value $X'_x$ serving essentially as an initial, or, also, starting, value, which represents preliminarily, or at least corresponds with, the physical measured variable x to be measured. Considering the very comprehensive and very detailed documentary state of the art, it is possible, without more, to assume, that the determining of the starting, measured value $X'_x$, which essentially corresponds to the measured value generated in conventional manner, presents absolutely no difficulties for those skilled in the art, so that, in the following explanation of the invention, the starting, measured value $X'_x$ can be assumed to be given. Further, the measuring device electronics generates, based on the determined oscillation frequency $f_{excT}$ of the torsional oscillations, at least one correction value $X_C$ taking into consideration the above-named operating condition of the measuring tube, for example, thus, the deposit D formed on the measuring tube. From this initial measured value $X'_x$, in turn, the measured value $X_x$, which represents the physical, measured variable x sufficiently accurately, for example as a mass flow rate, measured value, as a density measured value or as a viscosity measured value, is finally derived by means of the evaluating electronics 21, using the at least one correction value $X_C$. The correction of the intermediate value $X'_x$ on the basis of the correction value $X_C$, as well as also the generating of the measured value $X_x$, can occur in the measuring device electronics, for example based on the mathematical relationship $$X_x=(1+X_K)\cdot X'_x. \tag{5}$$

In a further development of the invention, the correction value $X_C$ instantaneously appropriate for the determination is obtained during operation, starting with the present oscillation frequency $f_{excT}$ of the torsional oscillations of the measuring tube practically directly by programming in the measuring device electronics an unequivocal relationship between a frequency value of the oscillation frequency $f_{excT}$ and the correction value $X_C$ matched thereto. To this end, measuring device electronics 2 has, additionally, a table memory, in which a set of initially determined (for example, in the calibration of the inline measuring device), digital, correction values $X_{C,i}$ is stored. These correction values $X_{C,i}$ are accessed by the measurement circuit practically directly via a memory address determined by means of the instantaneously appropriate, frequency value of the oscillation frequency $f_{excT}$. The correction value $X_C$ can e.g. be determined in simple manner by comparing a frequency value of the oscillation frequency $f_{excT}$ with values input therefor in the table memory and by then reading-out, thus using in the evaluation electronics 2 for the further calculations, that correction value $X_{C,i}$, which corresponds to the input value coming closest to the instantaneous constellation. The table memory can be a programmable, read-only memory, thus a FPGA (field programmable gate array), an EPROM or an EEPROM. The use of such a table memory has, among other things, the advantage, that the correction value $X_C$ is available very rapidly following the determining of the current oscillation frequency $f_{excT}$ during runtime. Additionally, the correction values $X_{C,i}$ entered into the table memory can be obtained very accurately at the start on the basis of few calibration measurements, e.g. based on the Equations (2), (3) and/or (4) and using the method of least squares.

As can be recognized, without more, from the above explanations, a correction of the initially measured value $X'_x$ can, on the one hand, be carried out using few, very simply determined, correction factors. On the other hand, the correction can be performed using the oscillation frequency $f_{excT}$ with very little in terms of calculational effort. Another advantage of the invention is further to be seen in the fact that at least some of the aforementioned correction factors can be derived from the operating parameters usually directly measured during operation of inline measuring devices of the described kind and, consequently, can be generated practically without marked increase in the circuit and measurement, technical effort.

The invention claimed is:

1. An inline measuring device for measuring at least one physical, measured variable of a medium conveyed in a pipeline, comprising:
  a measurement pickup of vibration-type; and
  measuring device electronics electrically coupled with said measurement pickup, wherein:
  said measurement pickup includes:
    at least one, essentially straight, measuring tube serving for the conveying of the medium to be measured and for communicating with the connected pipeline;
    an exciter mechanism acting on said at least one measuring tube for causing said at least one measuring tube to vibrate during operation with torsional oscillations about a torsional oscillation axis imaginarily connecting an inlet end of said measuring tube and an outlet end of said measuring tube; and
    a sensor arrangement for registering vibrations of said at least one measuring tube and delivering at least one oscillation measurement signal ($s_1$, $s_2$) representing oscillations of said measuring tube, further wherein:
  said measuring device electronics delivers, at least at times, an exciter signal driving said exciter mechanism, generates by means of one of: the at least one oscillation measurement signal and by means of the exciter signal at least at times, at least one measured value, which represents the at least one physical, measured variable to be measured; and
  said measuring device electronics determines, on the basis of the at least one oscillation measurement signal and/or on the basis of the exciter signal repetitively, an oscillation frequency, of the torsional oscillations of said measuring tube, and, based on the oscillation frequency, of the torsional oscillations, monitors at least one operating condition of said at least one measuring tube.

2. The inline measuring device as claimed in claim 1, wherein:
  said measuring device electronics detects, based on the determined oscillation frequency, of the torsional oscillations, at least the presence of a deposit formed on said measuring tube.

3. The inline measuring device as claimed in claim 2, wherein:
  said measuring device electronics determines, based on the determined oscillation frequency, of the torsional oscillations, an extent of the deposit formed on said measuring tube.

4. The inline measuring device as claimed in claim 2, wherein:
  said measuring device electronics determines, based on the determined oscillation frequency, of the torsional oscillations, at least one state value of a first kind, which signals at least the presence of a deposit formed on said measuring tube.

5. The inline measuring device as claimed in claim 4, wherein:
  the state value of the first kind determined by said measuring device electronics represents an extent of the deposit formed on said measuring tube.

6. The inline measuring device as claimed in claim 5, wherein:
  said measuring device electronics determines at least the state value of the first kind taking into consideration a density of the medium.

7. The inline measuring device as claimed in claim 5, wherein:
  said measuring device electronics determines the state value of the first kind also taking into consideration a viscosity of the medium.

8. The inline measuring device as claimed in claim 4, wherein: the state value of the first kind determined by said measuring device electronics represents a thickness of the deposit or a mass of the deposit.

9. The inline measuring device as claimed in claim 1, wherein:
  said measuring device electronics detects, based on the determined oscillation frequency of the torsional oscillations, abrasion of said measuring tube.

10. The inline measuring device as claimed in claim 9, wherein:

said measuring device electronics determines, based on the determined oscillation frequency of the torsional oscillations, at least one state value of a second kind, which signals at least the presence of abrasion of said measuring tube.

11. The inline measuring device as claimed in claim 10, wherein:
the state value of the second kind determined by said measuring device electronics represents an extent of the abrasion present on said measuring tube, especially a deficit in an instantaneous wall thickness of the tube wall of said measuring tube.

12. The inline measuring device as claimed in claim 10, wherein:
the state value of the second kind determined by said measuring device electronics represents a deficit in an instantaneous wall thickness of the tube wall of said measuring tube, compared to a nominal wall thickness.

13. The inline measuring device as claimed in claim 10, wherein:
the measuring device electronics provides, based on said state value of a second kind, an alarm signaling the presence of abrasion on the measuring tube.

14. The inline measuring device as claimed in claim 1, wherein:
said measuring device electronics determines, based on the determined oscillation frequency of the torsional oscillations, an extent of the abrasion present on said measuring tube.

15. The inline measuring device as claimed in claim 1, wherein:
the imagined torsional oscillation axis is directed essentially parallel to a principal axis of inertia of said measuring tube.

16. The inline measuring device as claimed in claim 15, wherein:
the imagined torsional oscillation axis essentially coincides with the principal axis of inertia of said measuring tube.

17. The inline measuring device as claimed in claim 1, wherein:
said exciter mechanism causes said measuring tube to execute, during operation, at least according to one of: at times and at least in part, lateral oscillations, about a lateral oscillation axis imaginarily connecting the inlet end of said measuring tube and the outlet end of said measuring tube together.

18. The inline measuring device as claimed in claim 17, wherein:
the imagined lateral oscillation axis is directed essentially in parallel with the torsional oscillation axis.

19. The inline measuring device as claimed in claim 18, wherein:
the imagined lateral oscillation axis essentially coincides with the torsional oscillation axis.

20. The inline measuring device as claimed in claim 17, wherein:
said exciter mechanism causes said measuring tube to execute, during operation, alternatingly, torsional oscillations or lateral oscillations.

21. The inline measuring device as claimed in claim 17, wherein:
said exciter mechanism causes said measuring tube to execute, during operation, at least at times, simultaneously, torsional oscillations and lateral oscillations, so that the torsional oscillations and lateral oscillations are mutually superimposed.

22. The inline measuring device as claimed in claim 17, wherein:
said measuring device electronics determines, on the basis of at least one of: one oscillation measurement signal and the exciter signal repetitively, an oscillation frequency of the lateral oscillations of said measuring tube.

23. The inline measuring device as claimed in claim 22, wherein:
the at least one measured value is a density measured value, which represents the density, $\rho$, of the medium to be measured; and
said measuring device electronics generates the at least one measured value based on the determined oscillation frequency of the lateral oscillations.

24. The inline measuring device as claimed in claim 23, wherein:
the at least one measured value is a viscosity measured value, which represents a viscosity of the medium to be measured.

25. The inline measuring device as claimed in claim 24, wherein:
said measuring device electronics determines the at least one measured value based on a damping of oscillations of said measuring tube dependent on the medium, using one of: the at least one oscillation measurement signal and the exciter signal.

26. The inline measuring device as claimed in claim 1, wherein:
said measuring device electronics determines, based on the determined oscillation frequency of the torsional oscillations, at least one correction value taking into consideration a deposit formed on said measuring tube; and
said measuring device electronics generates the at least one measured value also on the basis of the at least one correction value.

27. The inline measuring device as claimed in claim 1, wherein:
said exciter mechanism causes said measuring tube to execute, during operation, bending oscillations about a lateral oscillation axis imaginarily connecting the inlet end of said measuring tube and the outlet end of said measuring tube together.

28. The inline measuring device as claimed in claim 1, selected from a group consisting of: a Coriolis mass flow/density measuring device and a viscosity measuring device.

29. The inline measuring device as claimed in claim 1, wherein:
the at least one physical, measured variable is selected from a group consisting of: mass flow rate, density, and viscosity.

30. The inline measuring device as claimed in claim 1, wherein:
the exciter mechanism includes: an armature affixed to the measuring tube and an exciter coil.

31. The inline measuring device as claimed in claim 1, wherein the sensor arrangement includes at least one oscillation sensor.

32. The inline measuring device as claimed in claim 31, wherein:
the at least one oscillation sensor includes a sensor coil magnetically coupled with an armature.

33. The inline measuring device as claimed in claim 1, wherein:
measuring device electronics determines the oscillation frequency of the torsional oscillations of said measuring tube repetitively.

34. The inline measuring device as claimed in claim 1, wherein:
the measuring device electronics provides an alarm signaling the presence of abrasion on the measuring tube.

35. The inline measuring device as claimed in claim 1, wherein:
the measuring device electronics provides an alarm signaling an increased abrasion.

36. The inline measuring device as claimed in claim 1, wherein:
the measuring device electronics stores a state limit value for the measured oscillation frequency.

37. The inline measuring device as claimed in claim 36, wherein:
the measuring device electronics detects falling beneath of said state limit value by the measured oscillation frequency; and/or wherein the measuring device electronics detects subceeding of said state limit value by the measured oscillation frequency.

38. The inline measuring device as claimed in claim 1, wherein:
the measuring device electronics provides an alarm signaling a beginning deposit formation.

39. The inline measuring device as claimed in claim 1, wherein:
the measuring device electronics provides an alarm signaling a progressing deposit formation.

40. A method for monitoring an operating condition of a tube wall, which is contacted by a medium flowing, at least at times, and, as a result of such, is subjected, at least sectionally, to changes, by means of an inline measuring device having including a measurement pickup of vibration type, the method comprising the steps of:
causing the medium to flow through at least one measuring tube of the measurement pickup, which measuring tube communicates with a pipeline conveying the medium and connected to the measurement pickup, and feeding an exciter signal into an exciter mechanism mechanically coupled with the measuring tube for effecting torsional oscillations of the measuring tube about a torsional oscillation axis imaginarily connecting an inlet end of the measuring tube and an outlet end of the measuring tube;
registering vibrations of the measuring tube for producing at least one oscillation measurement signal at least partly representing torsional oscillations of the measuring tube and using the at least one oscillation measurement signal and/or the exciter signal for determining an oscillation frequency of the torsional oscillations of the measuring tube; and
producing, based on the determined oscillation frequency, of the torsional oscillations, a state value representing the operating condition of the tube wall.

41. The method as claimed in claim 40, wherein:
the state value signals at least the presence of a deposit on at least one section of the tube wall.

42. The method as claimed in claim 41, wherein:
the state value represents an extent of the deposit formed at least sectionally on the tube wall.

43. The method as claimed in claim 41, wherein:
the monitored section of the tube wall extends, at least in part, over the measuring tube.

44. The method as claimed in claim 41, wherein:
the monitored section of the tube wall extends, at least in part, over the pipeline connected to the measurement pickup.

45. The method as claimed in claim 41, wherein:
the state value represents a thickness of the deposit or a mass of the deposit.

46. The method as claimed in claim 40, wherein:
the state value signals at least the presence of abrasion on at least a section of the tube wall.

47. The method as claimed in claim 46, wherein:
the state value represents an extent of the abrasion present at least sectionally on the tube wall.

48. The method as claimed in claim 46, wherein: the state value represents a deficit in an instantaneous wall thickness of the tube wall, compared to a nominal wall thickness.

* * * * *